(12) United States Patent
Ikeda et al.

(10) Patent No.: US 8,601,872 B2
(45) Date of Patent: *Dec. 10, 2013

(54) VIBRATORY GYROSCOPE USING PIEZOELECTRIC FILM

(75) Inventors: Takashi Ikeda, Kaizuka (JP); Hiroshi Nishida, Takaishi (JP); Osamu Torayashiki, Akashi (JP); Mitsuhiko Takemura, Nishinomiya (JP); Tsuyoshi Fujimura, Amagasaki (JP); Ryuta Araki, Takarazuka (JP); Takafumi Moriguchi, Nishinomiya (JP); Nobutaka Teshima, Takatsuki (JP); Yasuyuki Hirata, Kobe (JP)

(73) Assignee: SUMITOMO PRECISION PRODUCTS Co., Ltd., Amagasaki-shi (JP)

( * ) Notice: Subject to any disclaimer, the term of this patent is extended or adjusted under 35 U.S.C. 154(b) by 450 days.

This patent is subject to a terminal disclaimer.

(21) Appl. No.: 12/934,620

(22) PCT Filed: Feb. 20, 2009

(86) PCT No.: PCT/JP2009/052960
§ 371 (c)(1),
(2), (4) Date: Sep. 24, 2010

(87) PCT Pub. No.: WO2009/119205
PCT Pub. Date: Oct. 1, 2009

(65) Prior Publication Data
US 2011/0041606 A1    Feb. 24, 2011

(30) Foreign Application Priority Data

Mar. 25, 2008 (JP) ................... 2008-077754

(51) Int. Cl.
*G01C 19/56* (2012.01)
*H01L 41/08* (2006.01)
*H01L 41/047* (2006.01)

(52) U.S. Cl.
USPC ................. 73/504.12; 310/329; 310/366

(58) Field of Classification Search
USPC ................................................. 73/504.12
See application file for complete search history.

(56) References Cited

U.S. PATENT DOCUMENTS 8,375,792 B2 * 2/2013 Ikeda et al. ............... 73/504.13

FOREIGN PATENT DOCUMENTS

JP   H08-068638 A   3/1996
JP   08-271258 A    10/1996
(Continued)

*Primary Examiner* — Hezron E Williams
*Assistant Examiner* — Gregory J Redmann
(74) *Attorney, Agent, or Firm* — Marvin A. Motsenbocker; Mots Law, PLLC

(57) ABSTRACT

A vibrating gyroscope according to this invention includes a ring-shaped vibrating body 11 having a uniform plane, a leg portion 15 flexibly supporting the ring-shaped vibrating body and having a fixed end, a fixed potential electrode 16, and a plurality of electrodes 13a, 13b, ..., 13h formed on the plane with a piezoelectric film sandwiched between an upper-layer metallic film and a lower-layer metallic film in a thickness direction thereof. In this case, in a representative example shown in FIG. 1, when one of driving electrodes 13a for exciting a primary vibration of the ring-shaped vibrating body 11 in a vibration mode of cos Nθ is set as a reference driving electrode, the plurality of remaining electrodes 13b, ..., 13h are disposed at specific positions. Such disposition allows this vibrating gyroscope to detect a uniaxial to triaxial angular velocity by adopting a secondary vibration detector inclusive of an out-of-plane vibration mode.

11 Claims, 26 Drawing Sheets

(56) References Cited

FOREIGN PATENT DOCUMENTS

| | | |
|---|---|---|
| JP | 2000-009473 A | 1/2000 |
| WO | WO99/47890 A1 | 9/1999 |
| WO | WO99/47891 A1 | 9/1999 |
| WO | WO03/025503 A1 | 3/2003 |
| WO | WO2009/096086 A1 | 8/2009 |

* cited by examiner

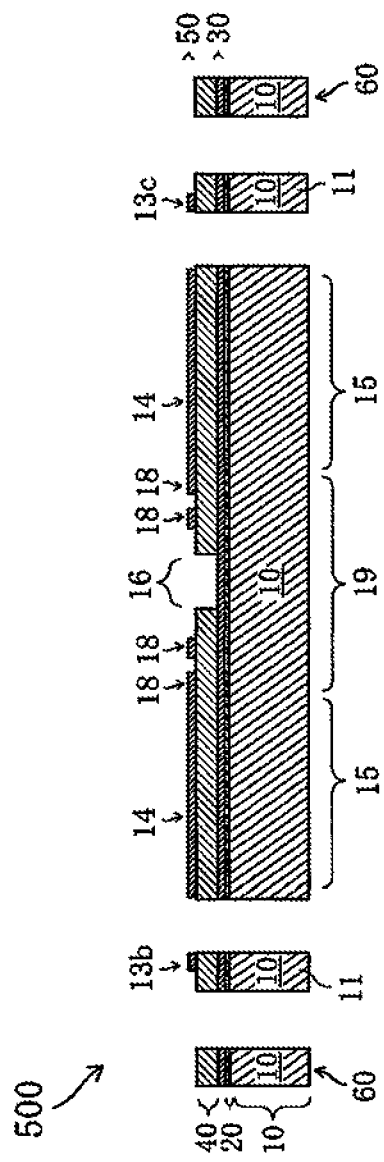

US 8,601,872 B2

VIBRATORY GYROSCOPE USING PIEZOELECTRIC FILM

TECHNICAL FIELD

The present invention relates to a vibrating gyroscope using a piezoelectric film, and more particularly relates to a vibrating gyroscope that is capable of measuring variations in maximally triaxial angular velocity.

BACKGROUND ART

In recent years, vibrating gyroscopes using piezoelectric materials have been widely developed. There have been conventionally developed a gyroscope as described in Patent Document 1, including a vibrating body itself made of such a piezoelectric material. On the other hand, there is a gyroscope using a piezoelectric film that is formed on a vibrating body. For example, Patent Document 2 discloses a technique for, using a PZT film as a piezoelectric material, exciting a primary vibration of a vibrating body as well as for detecting partial distortion of a gyroscope, which is caused by a coriolis force generated when an angular velocity is applied to the vibrating body.

Reduction in size of a gyroscope itself is also an important issue as a wide variety of devices mounted with gyroscopes have been quickly reduced in size. In order to reduce the size of a gyroscope, significant improvement is required to accuracy of processing each member of the gyroscope. Desired in the industry are not only simple size reduction but also further improvement in performance of a gyroscope, namely, in accuracy of detecting an angular velocity. However, the configuration of the gyroscope described in Patent Document 2 does not satisfy the demand over the last few years for reduction in size or improvement in performance.

In view of the above technical problems, the applicants of the present invention propose a technical idea of basically performing all the manufacturing steps in a dry process to realize high processing accuracy as well as to satisfy the demand for high performance as a vibrating gyroscope (Patent Document 3).

In addition to the above technical problems, expectations are being increased for a vibrating gyroscope that measures an angular velocity of multi rotational axes (Patent Document 4, for example). Nevertheless, satisfactory development has not yet been made to a vibrating gyroscope that has a simple and useful configuration to realize reduction in size.
Patent Document 1: Japanese Unexamined Patent Publication No. H08-271258
Patent Document 2: Japanese Unexamined Patent Publication No. 2000-9473
Patent Document 3: Japanese Patent Application No. 2008-28835
Patent Document 4: Japanese Patent Application No. 2005-529306
Patent Document 5: Japanese Published Patent Publication No. 2002-509615
Patent Document 6: Japanese Published Patent Publication No. 2002-510398

DISCLOSURE OF THE INVENTION

Problems to be Solved by the Invention

As described above, it is very difficult to achieve reduction in size and high processing accuracy in a vibrating gyroscope using a piezoelectric film as well as to satisfy, at the same time, the demand for improvement in performance of the gyroscope. A gyroscope of a small size generally has a problem that, upon application of an angular velocity to a vibrating body, weakened is a signal to be detected by a detection electrode of the gyroscope. Moreover, the vibrating gyroscope according to Patent Document 4 described above adopts a system of substantially measuring variations in capacitance while being capable of measuring an angular velocity of multi rotational axes. As shown in FIGS. 2 and 3 of Patent Document 4, this vibrating gyroscope has a complex configuration in which several electrodes are not disposed on a vibrating body. Therefore, the technical value will be further increased if a vibrating gyroscope is capable of also measuring an angular velocity of multi rotational axes in a simple configuration to realize reduction in size.

Solutions to the Problems

The present invention solves the above technical problems to significantly contribute to reduction in size and improvement in performance of a vibrating gyroscope that uses a piezoelectric film and is capable of measuring an angular velocity of a single or multi rotational axes. The inventors studied intensively to obtain a configuration for solving the respective technical problems by causing the piezoelectric film to excite a primary vibration as well as to detect a secondary vibration generated by a coriolis force. Found as a result is that measurement of angular velocities of a single rotational axis as well as of multi rotational axes is enabled by refining the disposition of respective types of electrodes configured by the piezoelectric film as well as the configuration for supporting the vibrating body. Furthermore, the inventors found that such disposition thereof can be achieved by a dry process realizing high processing accuracy. The present invention was created through such a philosophy. It is noted that, in the present application, an "annular or polygonal vibrating gyroscope" is sometimes simply referred to as a "ring-shaped vibrating gyroscope".

A vibrating gyroscope according to the present invention includes: a ring-shaped vibrating body having a uniform plane; a leg portion flexibly supporting the ring-shaped vibrating body and having a fixed end; a fixed potential electrode; and a plurality of electrodes formed on the plane with a piezoelectric film sandwiched between an upper-layer metallic film and a lower-layer metallic film in a thickness direction thereof. The plurality of electrodes include:

(1) when N is a natural number of 2 or more, a group of driving electrodes for exciting a primary vibration of the ring-shaped vibrating body in a vibration mode of cos Nθ, which are disposed $(360/N)°$ apart from each other in a circumferential direction; and (2) a group of detection electrodes for detecting a secondary vibration in a vibration mode of cos $(N+1)θ$ generated when an angular velocity is applied to the ring-shaped vibrating body, and, when one of the driving electrodes is set as a reference driving electrode and S=0, 1, ..., N (hereinafter, always true in this paragraph), the group of detection electrodes having an electrode disposed $[\{360/(N+1)\} \times S]°$ apart from the reference driving electrode and/or an electrode disposed $[\{360/(N+1)\} \times \{S+(½)\}]°$ apart from the reference driving electrode.

Further, each of the driving electrodes is disposed in the plane and on a first electrode disposition portion that has a region from an outer peripheral edge of the ring-shaped vibrating body to a vicinity of the outer peripheral edge and/or a region from an inner peripheral edge thereof to a vicinity of the inner peripheral edge, and each of the detection electrodes is disposed on a second electrode disposition portion that is not electrically connected to the first electrode disposition portion.

In this vibrating gyroscope, since a piezoelectric element is formed as an electrode in the specific region described above on the plane of the ring-shaped vibrating body, the piezoelectric element functions as a uniaxial angular velocity sensor and is capable of exciting the primary vibration as well as detecting the secondary vibration. In other words, this vibrating gyroscope is configured to excite the primary vibration in a plane identical with the plane (an X-Y plane, for example) including the piezoelectric element on the ring-shaped vibrating body (hereinafter, also referred to as in plane) as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. Further, it is recognized as significantly advantageous that this vibrating gyroscope is capable of detecting a uniaxial (the X axis, for example) angular velocity by adopting a vibration mode not in the plane including the piezoelectric element (hereinafter, also referred to as an out-of-plane vibration mode). Several examples of the vibration mode of $\cos N\theta$ are described, for example, in Patent Documents 4 to 6 cited above or in Japanese Patent Application No. 2007-209014 that was filed by the applicant of the present application. The term "flexible" is used to mean "so as to allow the vibrating body to vibrate" in the entire invention of the present application.

A different vibrating gyroscope according to the present invention includes: a ring-shaped vibrating body having a uniform plane; a leg portion flexibly supporting the ring-shaped vibrating body and having a fixed end; a fixed potential electrode; and a plurality of electrodes formed on the plane with a piezoelectric film sandwiched between an upper-layer metallic film and a lower-layer metallic film in a thickness direction thereof. The plurality of electrodes include:

(1) when N is a natural number of 2 or more, a group of driving electrodes for exciting a primary vibration of the ring-shaped vibrating body in a vibration mode of $\cos N\theta$, which are disposed $(360/N)°$ apart from each other in a circumferential direction; and (2) a group of detection electrodes for detecting a secondary vibration in a vibration mode of $\cos(N+1)\theta$ generated when an angular velocity is applied to the ring-shaped vibrating body, and, when one of the driving electrodes is set as a reference driving electrode and $S=0, 1, \ldots, N$ (hereinafter, always true in this paragraph), the group of detection electrodes having an electrode disposed $[\{360/(N+1)\}\times\{S+(¼)\}]°$ apart from the reference driving electrode and/or an electrode disposed $[\{360/(N+1)\}\times\{S+(¾)\}]°$ apart from the reference driving electrode.

Further, each of the driving electrodes is disposed in the plane and on a first electrode disposition portion that has a region from an outer peripheral edge of the ring-shaped vibrating body to a vicinity of the outer peripheral edge and/or a region from an inner peripheral edge thereof to a vicinity of the inner peripheral edge, and each of the detection electrodes is disposed on a second electrode disposition portion that is not electrically connected to the first electrode disposition portion.

Also in this vibrating gyroscope, since a piezoelectric element is formed as an electrode in the specific region described above on the plane of the ring-shaped vibrating body, the piezoelectric element functions as a uniaxial angular velocity sensor and is capable of exciting the primary vibration as well as detecting the secondary vibration. In other words, this vibrating gyroscope is configured to excite the primary vibration in a plane identical with the plane (an X-Y plane, for example) including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. Further, it is recognized as significantly advantageous that this vibrating gyroscope is capable of detecting a uniaxial (the X axis, for example) angular velocity by adopting an out-of-plane vibration mode.

A different vibrating gyroscope according to the present invention includes: a ring-shaped vibrating body having a uniform plane; a leg portion flexibly supporting the ring-shaped vibrating body and having a fixed end; a fixed potential electrode; and a plurality of electrodes formed on the plane with a piezoelectric film sandwiched between an upper-layer metallic film and a lower-layer metallic film in a thickness direction thereof. The plurality of electrodes include:

(1) when N is a natural number of 3 or more, a group of driving electrodes for exciting a primary vibration of the ring-shaped vibrating body in a vibration mode of $\cos N\theta$, which are disposed $(360/N)°$ apart from each other in a circumferential direction; and (2) a group of detection electrodes for detecting a secondary vibration in a vibration mode of $\cos(N-1)\theta$ generated when an angular velocity is applied to the ring-shaped vibrating body, and when one of the driving electrodes is set as a reference driving electrode and $S=0, 1, \ldots, N-2$ (hereinafter, always true in this paragraph), the group of detection electrodes having an electrode disposed $[\{360/(N-1)\}\times S]°$ apart from the reference driving electrode and/or an electrode disposed $[\{360/(N-1)\}\times\{S+(½)\}]°$ apart from the reference driving electrode.

Further, each of the driving electrodes is disposed in the plane and on a first electrode disposition portion that has a region from an outer peripheral edge of the ring-shaped vibrating body to a vicinity of the outer peripheral edge and/or a region from an inner peripheral edge thereof to a vicinity of the inner peripheral edge, and each of the detection electrodes is disposed on a second electrode disposition portion that is not electrically connected to the first electrode disposition portion.

Also in this vibrating gyroscope, since a piezoelectric element is formed as an electrode in the specific region described above on the plane of the ring-shaped vibrating body, the piezoelectric element functions as a uniaxial angular velocity sensor and is capable of exciting the primary vibration as well as detecting the secondary vibration. In other words, this vibrating gyroscope is configured to excite the primary vibration in a plane identical with the plane (an X-Y plane, for example) including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. Further, it is recognized as significantly advantageous that this vibrating gyroscope is capable of detecting a uniaxial (the X axis, for example) angular velocity by adopting an out-of-plane vibration mode.

A different vibrating gyroscope according to the present invention includes: a ring-shaped vibrating body having a uniform plane; a leg portion flexibly supporting the ring-shaped vibrating body and having a fixed end; a fixed potential electrode; and a plurality of electrodes formed on the plane with a piezoelectric film sandwiched between an upper-layer metallic film and a lower-layer metallic film in a thickness direction thereof. The plurality of electrodes include:

(1) when N is a natural number of 3 or more, a group of driving electrodes for exciting a primary vibration of the ring-shaped vibrating body in a vibration mode of cos Nθ, which are disposed $(360/N)°$ apart from each other in a circumferential direction; and (2) a group of detection electrodes for detecting a secondary vibration in a vibration mode of cos $(N-1)θ$ generated when an angular velocity is applied to the ring-shaped vibrating body, and, when one of the driving electrodes is set as a reference driving electrode and S=0, 1, . . . , N−2 (hereinafter, always true in this paragraph), the group of detection electrodes having an electrode disposed $[\{360/(N-1)\} \times \{S+(¼)\}]°$ apart from the reference driving electrode and/or an electrode disposed $[\{360/(N-1)\} \times \{S+(¾)\}]°$ apart from the reference driving electrode.

Further, each of the driving electrodes is disposed in the plane and on a first electrode disposition portion that has a region from an outer peripheral edge of the ring-shaped vibrating body to a vicinity of the outer peripheral edge and/or a region from an inner peripheral edge thereof to a vicinity of the inner peripheral edge, and each of the detection electrodes is disposed on a second electrode disposition portion that is not electrically connected to the first electrode disposition portion.

Also in this vibrating gyroscope, since a piezoelectric element is formed as an electrode in the specific region described above on the plane of the ring-shaped vibrating body, the piezoelectric element functions as a uniaxial angular velocity sensor and is capable of exciting the primary vibration as well as detecting the secondary vibration. In other words, this vibrating gyroscope is configured to excite the primary vibration in a plane identical with the plane (an X-Y plane, for example) including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. Further, it is recognized as significantly advantageous that this vibrating gyroscope is capable of detecting a uniaxial (the X axis, for example) angular velocity by adopting an out-of-plane vibration mode.

A different vibrating gyroscope according to the present invention includes: a ring-shaped vibrating body having a uniform plane; a leg portion flexibly supporting the ring-shaped vibrating body and having a fixed end; a fixed potential electrode; and a plurality of electrodes formed on the plane with a piezoelectric film sandwiched between an upper-layer metallic film and a lower-layer metallic film in a thickness direction thereof. The plurality of electrodes include:

(1) when N is a natural number of 2 or more, a group of driving electrodes for exciting a primary vibration of the ring-shaped vibrating body in a vibration mode of cos Nθ, which are disposed $(360/N)°$ apart from each other in a circumferential direction;

(2) a group of first detection electrodes for detecting a secondary vibration in a vibration mode of cos $(N+1)θ$ generated when an angular velocity is applied to the ring-shaped vibrating body, and, when one of the driving electrodes is set as a reference driving electrode and S=0, 1, . . . , N (hereinafter, always true in this paragraph), the group of first detection electrodes having an electrode disposed $[\{360/(N+1)\} \times S]°$ apart from the reference driving electrode and/or an electrode disposed $[\{360/(N+1)\} \times \{S+(½)\}]°$ apart from the reference driving electrode; and (3) a group of second detection electrodes for detecting a secondary vibration of a vibration axis $\{90/(N+1)\}°$ apart from that of the secondary vibration in (2), and the group of second detection electrodes having an electrode disposed $[\{360/(N+1)\} \times \{S+(¼)\}]°$ apart from the reference driving electrode and/or an electrode disposed $[\{360/(N+1)\} \times \{S+(¾)\}]°$ apart from the reference driving electrode.

Further, each of the driving electrodes is disposed in the plane and on a first electrode disposition portion that has a region from an outer peripheral edge of the ring-shaped vibrating body to a vicinity of the outer peripheral edge and/or a region from an inner peripheral edge thereof to a vicinity of the inner peripheral edge, and each of the first detection electrodes and the second detection electrodes is disposed on a second electrode disposition portion that is not electrically connected to the first electrode disposition portion.

In this vibrating gyroscope, since a piezoelectric element is formed as an electrode in the specific region described above on the plane of the ring-shaped vibrating body, the piezoelectric element functions as a biaxial angular velocity sensor and is capable of exciting the primary vibration as well as detecting the secondary vibration. In other words, this vibrating gyroscope is configured to excite the primary vibration in a plane identical with the plane (the X-Y plane, for example) including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. Further, it is recognized as significantly advantageous that this vibrating gyroscope is capable of detecting a biaxial (the X axis and the Y axis, for example) angular velocity by adopting an out-of-plane vibration mode.

There is exerted an effect similar to the effect of the above biaxial angular velocity sensor even when, in place of the detection electrodes configured according to (2) or (3) in the plurality of electrodes of the above biaxial vibrating gyroscope, detection electrodes configured according to (Revision 2 or 3) are adopted as first detection electrodes or second detection electrodes. In this case, the detection electrodes configured according to (Revision 2 or 3) described below are disposed on the first electrode disposition portion, and two axes for detection by the detection electrodes are the X axis and the Z axis, or the Y axis and the Z axis.

(Revision 2 or 3) a group of detection electrodes for detecting a secondary vibration in a vibration mode of cos Nθ generated when an angular velocity is applied to the ring-shaped vibrating body, the group of detection electrodes having, when M=0, 1, . . . , N−1 (hereinafter, always true in this paragraph), an electrode disposed $[(360/N) \times \{M+(¼)\}]°$ apart from the reference driving electrode and/or an electrode disposed $[(360/N) \times \{M+(¾)\}]°$ apart from the reference driving electrode Further, it is recognized as significantly advantageous that, when detection electrodes configured according to (4) described below are added as third detection electrodes to the plurality of electrodes of the above biaxial vibrating gyroscope, realized are detection of totally triaxial angular velocity, namely, detection of an angular velocity by adopting a biaxial (the X axis and the Y axis, for example) out-of-plane vibration mode as well as detection of an angular velocity by adopting a uniaxial (the Z axis, for example) in-plane vibration mode. In this case, the detection electrodes configured according to (4) are disposed on the first electrode disposition portion.

(4) a group of third detection electrodes for detecting a secondary vibration in a vibration mode of cos Nθ generated when an angular velocity is applied to the ring-shaped vibrating body, the group of third detection electrodes having, when M=0, 1, . . . , N−1 (hereinafter, always true in this paragraph), an electrode disposed $[(360/N) \times \{M+(1/4)\}]°$ apart from the reference driving electrode and/or an electrode disposed $[(360/N) \times \{M+(3/4)\}]°$ apart from the reference driving electrode A different vibrating gyroscope according to the present invention includes: a ring-shaped vibrating body having a uniform plane; a leg portion flexibly supporting the ring-shaped vibrating body and having a fixed end;

a fixed potential electrode; and a plurality of electrodes formed on the plane with a piezoelectric film sandwiched between an upper-layer metallic film and a lower-layer metallic film in a thickness direction thereof. The plurality of electrodes include:

(1) when N is a natural number of 3 or more, a group of driving electrodes for exciting a primary vibration of the ring-shaped vibrating body in a vibration mode of cos Nθ, which are disposed $(360/N)°$ apart from each other in a circumferential direction;

(2) a group of first detection electrodes for detecting a secondary vibration in a vibration mode of cos (N−1)θ generated when an angular velocity is applied to the ring-shaped vibrating body, and, when one of the driving electrodes is set as a reference driving electrode and S=0, 1, . . . , N−2 (hereinafter, always true in this paragraph), the group of first detection electrodes having an electrode disposed $[\{360/(N-1)\} \times S]°$ apart from the reference driving electrode and/or an electrode disposed $[\{360/(N-1)\} \times \{S+(1/2)\}]°$ apart from the reference driving electrode; and (3) a group of second detection electrodes for detecting a secondary vibration of a vibration axis $\{90/(N-1)\}°$ apart from that of the secondary vibration in (2), the group of second detection electrodes having an electrode disposed $[\{360/(N-1)\} \times \{S+(1/4)\}]°$ apart from the reference driving electrode and/or an electrode disposed $[\{360/(N-1)\} \times \{S+(3/4)\}]°$ apart from the reference driving electrode.

Further, each of the driving electrodes is disposed in the plane and on a first electrode disposition portion that has a region from an outer peripheral edge of the ring-shaped vibrating body to a vicinity of the outer peripheral edge and/or a region from an inner peripheral edge thereof to a vicinity of the inner peripheral edge, and each of the first detection electrodes and the second detection electrodes is disposed on a second electrode disposition portion that is not electrically connected to the first electrode disposition portion.

In this vibrating gyroscope, since a piezoelectric element is formed as an electrode in the specific region described above on the plane of the ring-shaped vibrating body, the piezoelectric element functions as a biaxial angular velocity sensor and is capable of exciting the primary vibration as well as detecting the secondary vibration. In other words, this vibrating gyroscope is configured to excite the primary vibration in a plane identical with the plane (the X-Y plane, for example) including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. Further, it is recognized as significantly advantageous that this vibrating gyroscope is capable of detecting a biaxial (the X axis and the Y axis, for example) angular velocity by adopting an out-of-plane vibration mode.

There is exerted an effect similar to the effect of the above biaxial angular velocity sensor even when, in place of the detection electrodes configured according to (2) or (3) in the plurality of electrodes of the above biaxial vibrating gyroscope, detection electrodes configured according to (Revision 2 or 3) described below are adopted as first detection electrodes or second detection electrodes. In this case, the detection electrodes configured according to (Revision 2 or 3) are disposed on the first electrode disposition portion, and two axes for detection by the detection electrodes are the X axis and the Z axis, or the Y axis and the Z axis.

(Revision 2 or 3) a group of detection electrodes for detecting a secondary vibration in a vibration mode of cos Nθ generated when an angular velocity is applied to the ring-shaped vibrating body, the group of detection electrodes having, when M=0, 1, . . . , N−1 (hereinafter, always true in this paragraph), an electrode disposed $[(360/N) \times \{M+(1/4)\}]°$ apart from the driving electrode and/or an electrode disposed $[(360/N) \times \{M+(3/4)\}]°$ apart from the reference driving electrode Further, it is recognized as significantly advantageous that, when detection electrodes configured according to (4) described below are added as third detection electrodes to the plurality of electrodes of the above biaxial vibrating gyroscope, realized are detection of totally triaxial angular velocity, namely, detection of an angular velocity by adopting a biaxial (the X axis and the Y axis, for example) out-of-plane vibration mode as well as detection of an angular velocity by adopting a uniaxial (the Z axis, for example) in-plane vibration mode. In this case, the detection electrodes configured according to (4) are disposed on the first electrode disposition portion.

(4) a group of third detection electrodes for detecting a secondary vibration in a vibration mode of cos Nθ generated when an angular velocity is applied to the ring-shaped vibrating body, the group of third detection electrodes having, when M=0, 1, . . . , N−1 (hereinafter, always true in this paragraph), an electrode disposed $[(360/N) \times \{M+(1/4)\}]°$ apart from the reference driving electrode and/or an electrode disposed $[(360/N) \times \{M+(3/4)\}]°$ apart from the reference driving electrode Further, it is a preferable aspect to add monitor electrodes configured according to (5) described below to the plurality of electrodes of the above uniaxial, biaxial, or triaxial vibrating gyroscope, since the disposition of other electrode groups and/or the metal tracks is facilitated in a limited planar region of a ring-shaped vibrating body that is particularly reduced in size.

(5) when M=0, 1, . . . , N−1 (hereinafter, always true in this paragraph), a group of monitor electrodes disposed $[(360/N) \times \{M+(1/2)\}]°$ apart from the reference driving electrode in the circumferential direction Effects of the Invention In a vibrating gyroscope according to the present invention, since a piezoelectric element is formed as an electrode in the specific region described above on the plane of the ring-shaped vibrating body, the piezoelectric element functions as a uniaxial to triaxial angular velocity sensor and is capable of exciting the primary vibration as well as detecting the secondary vibration. In other words, this vibrating gyroscope is configured to excite the primary vibration in a plane identical with the plane (the X-Y plane, for example) including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. This vibrating gyroscope is capable of detecting a uniaxial to triaxial angular velocity by adopting a secondary vibration detector inclusive of an out-of-plane vibration mode.

BRIEF DESCRIPTION OF THE DRAWINGS

FIG. 8 is a cross sectional view taken along line B-B of FIG. 7.

BEST MODE FOR CARRYING OUT THE INVENTION

Embodiments of the present invention are described in detail with reference to the accompanying drawings. In the description, common parts are denoted by common reference symbols in all the drawings unless otherwise specified. Further, the elements in these embodiments are not necessarily illustrated in accordance with the same scale.

First Embodiment

Figure 1:
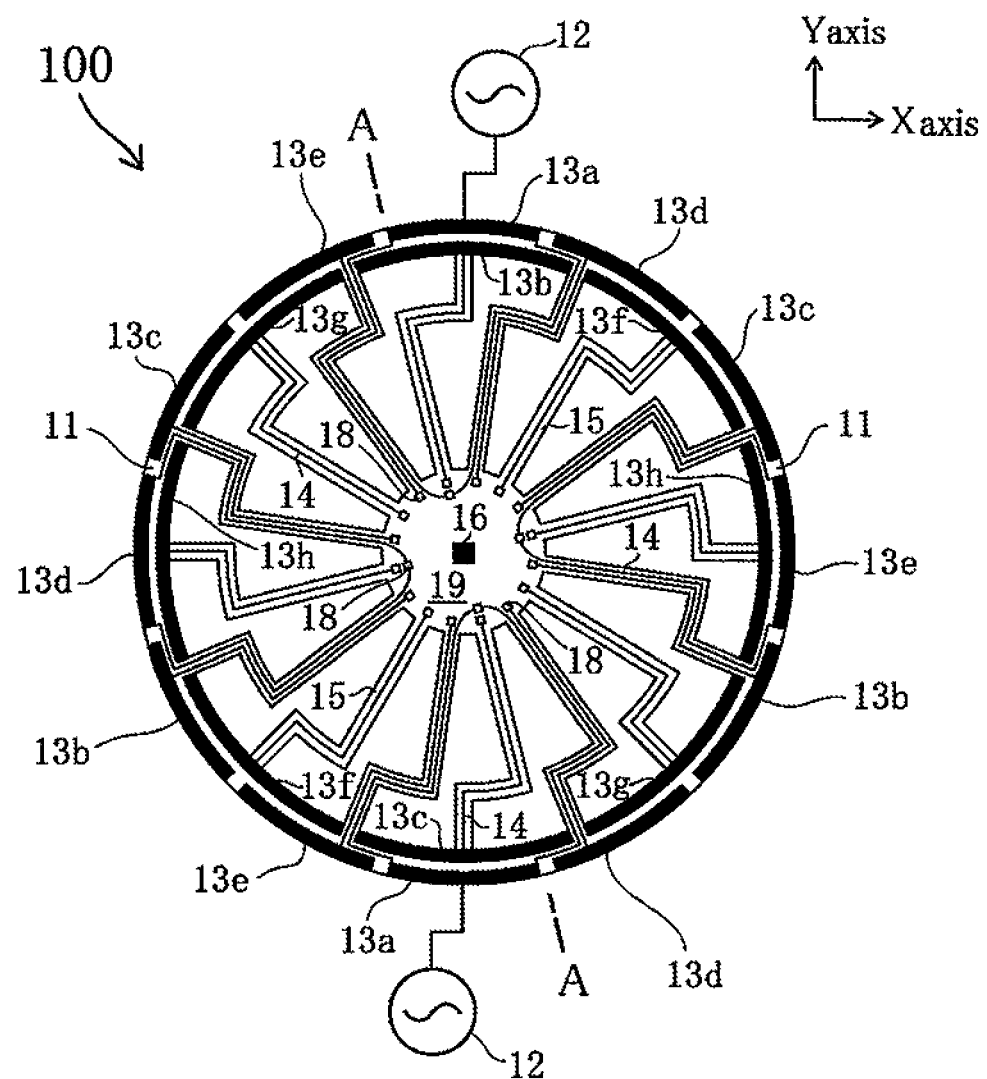
FIG. 1 is a front view of a structure having a principal function in a ring-shaped vibrating gyroscope according to an embodiment of the present invention.
Figure 2:
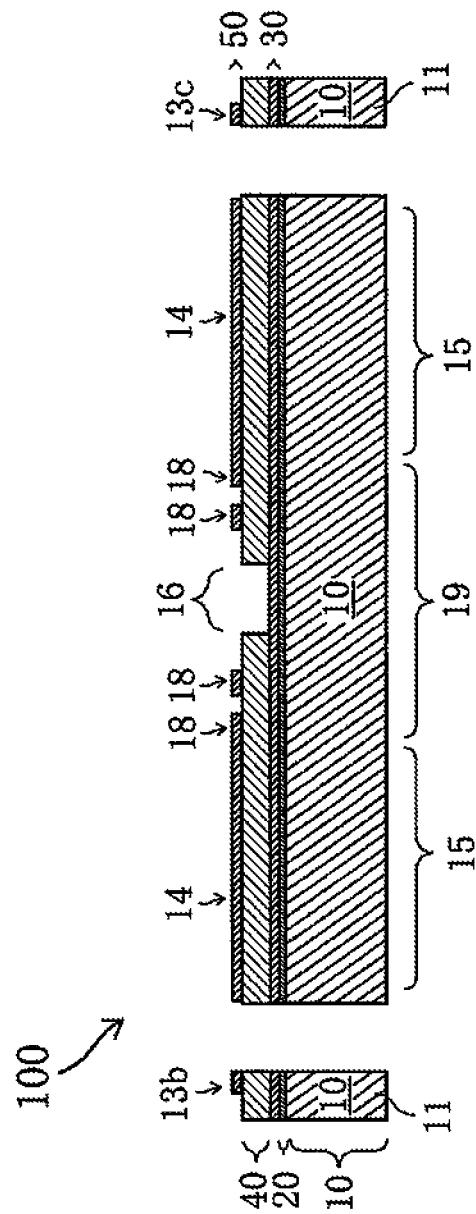
FIG. 2 is a cross sectional view taken along line A-A of FIG. 1.

FIG. 1 is a front view of a structure having a principal function in a ring-shaped vibrating gyroscope 100 for measuring a triaxial angular velocity according to the present embodiment. FIG. 2 is a cross sectional view taken along line A-A of FIG. 1. For the purpose of easier illustration, an X axis and a Y axis are indicated in FIG. 1.

As shown in FIGS. 1 and 2, the ring-shaped vibrating gyroscope 100 according to the present embodiment is generally divided into three structures. A first structure includes a ring-shaped vibrating body 11 formed with a silicon substrate 10, a silicon oxide film 20 on an upper plane (hereinafter, referred to as an upper surface) of the ring-shaped vibrating body 11, and a plurality of electrodes 13a to 13h formed thereon with a piezoelectric film 40 sandwiched between a lower-layer metallic film 30 and an upper-layer metallic film 50. In the present embodiment, the upper-layer metallic film 50 configuring the plurality of electrodes 13a to 13h has an outer end or an inner end formed inside by approximately 1 μm with respect to the outer peripheral edge or the inner peripheral edge of the ring-shaped vibrating body 11 that has a ring-shaped plane of approximately 40 μm wide, so as to be approximately 18 μm wide. In the upper-layer metallic film 50, some of the electrodes are formed outside a line connecting centers (hereinafter, simply referred to as a center line) of both ends in the width direction of the ring-shaped plane that serves as the upper surface of the ring-shaped vibrating body 11. The remaining twelve electrodes are formed inside the center line.

Figure 9A:
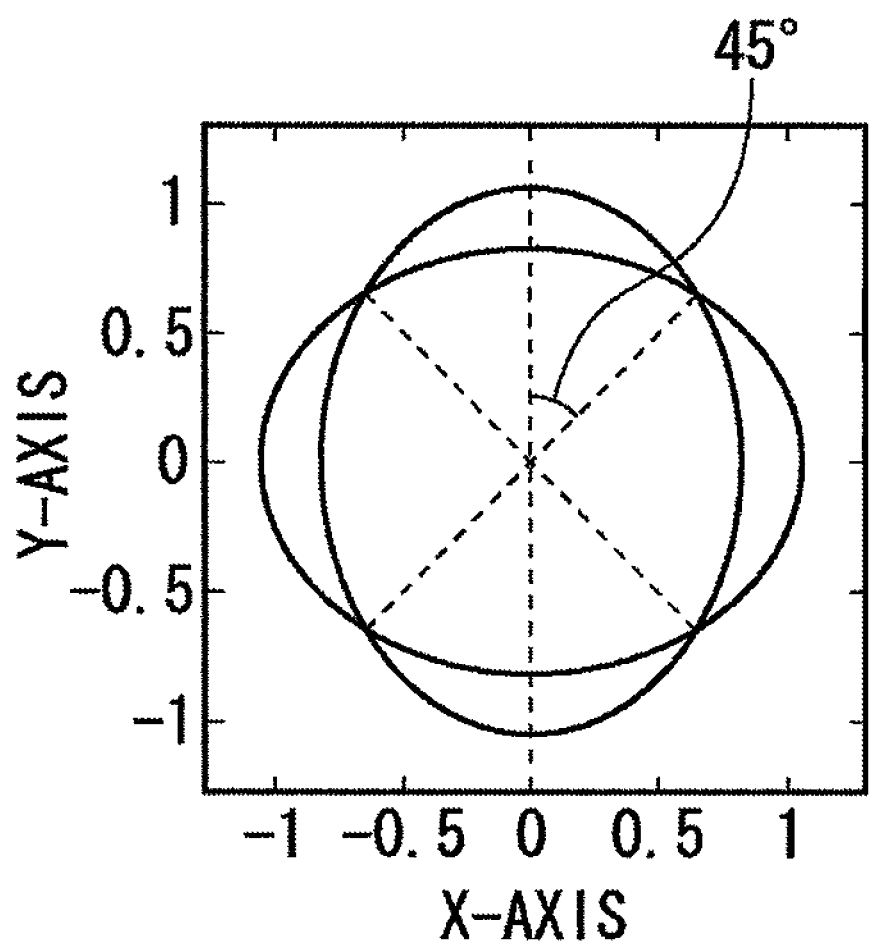
FIG. 9A is a view conceptually illustrating a primary vibration in a vibration mode of cos 2θ according to an embodiment of the present invention.
Figure 9B:
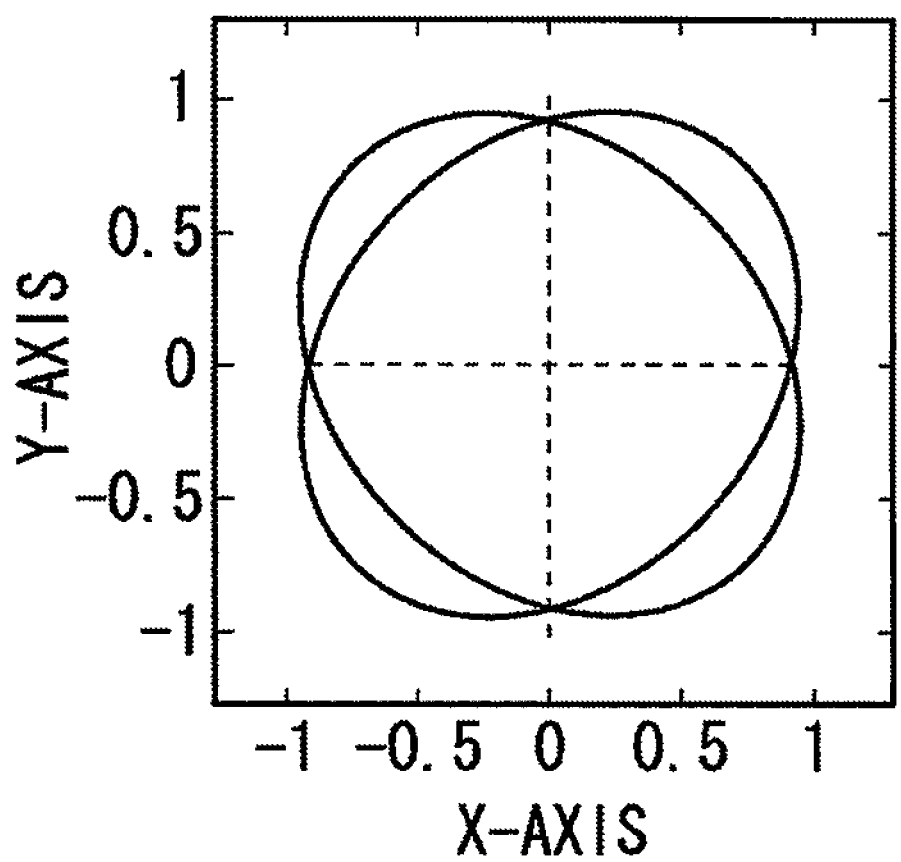
FIG. 9B is a view conceptually illustrating a secondary vibration in an in-plane vibration mode of cos 2θ in a case where an angular velocity is applied about a Z axis, according to an embodiment of the present invention.
Figure 9C:
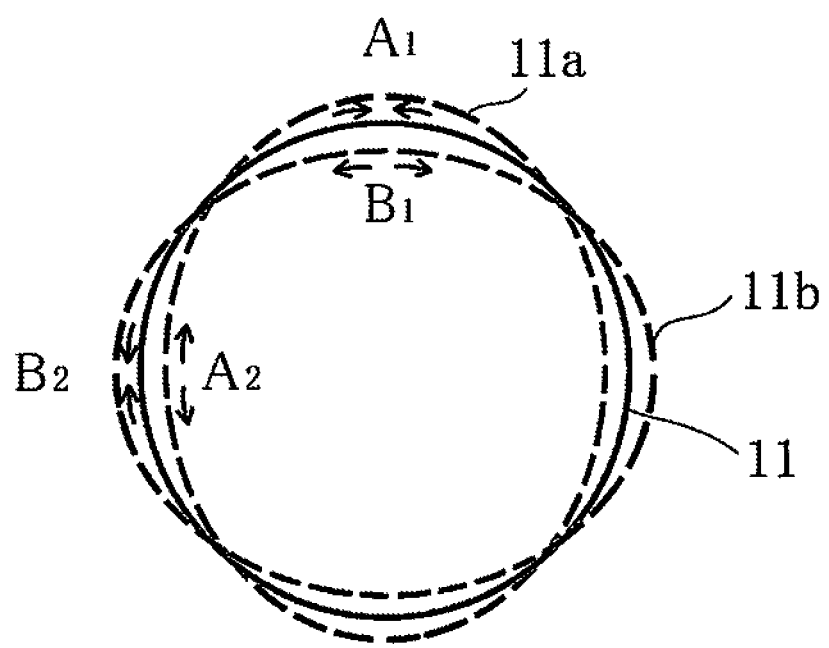
FIG. 9C is a view conceptually illustrating positive/negative polarities of electrical signals of a third detection electrode.
Figure 9D:
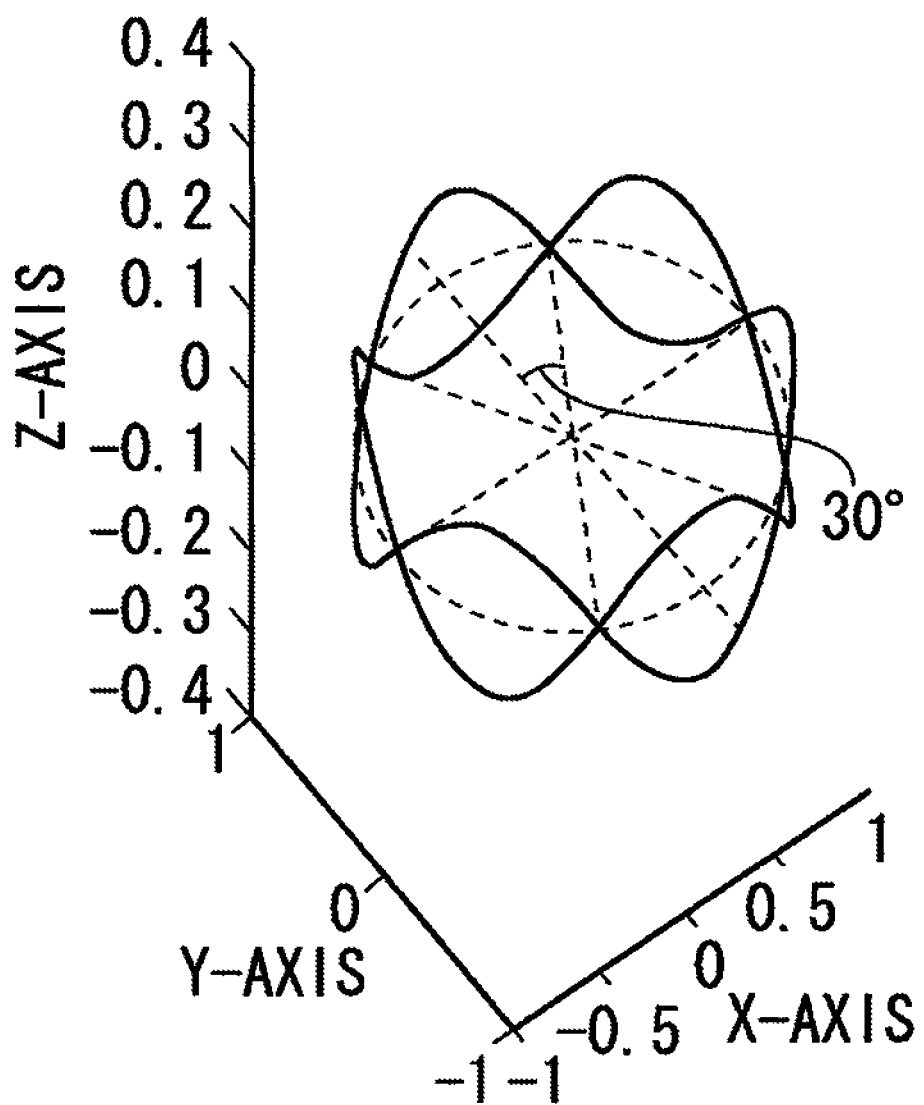
FIG. 9D is a view conceptually illustrating a secondary vibration in an out-of-plane vibration mode of cos 3θ in a case where an angular velocity is applied about an X axis, according to an embodiment of the present invention.
Figure 9E:
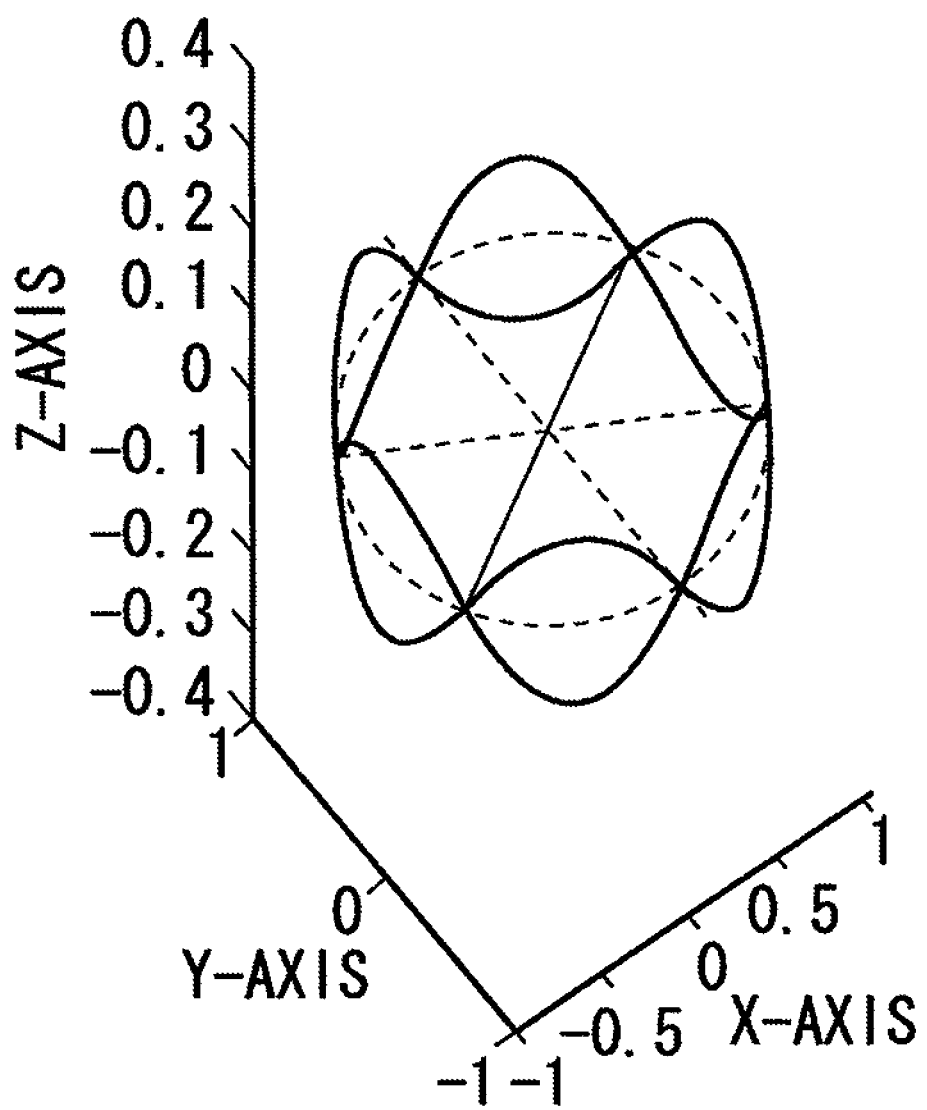
FIG. 9E is a view conceptually illustrating a secondary vibration in an out-of-plane vibration mode of cos 3θ in a case where an angular velocity is applied about a Y axis, according to an embodiment of the present invention.

In the present embodiment, a primary vibration of the ring-shaped vibrating gyroscope 100 is excited in an in-plane vibration mode of cos 2θ as indicated in FIG. 9A. A secondary vibration in the present embodiment has an out-of-plane vibration mode of cos 3θ with respect to the X axis as indicated in FIG. 9D, an out-of-plane vibration mode of cos 3θ with respect to the Y axis as indicated in FIG. 9E, and an in-plane vibration mode of cos 2θ with respect to an axis (the Z axis) as indicated in FIG. 9B. Thus, the plurality of electrodes 13a to 13h are categorized as follows. Firstly, two driving electrodes 13a, 13a are disposed 180° apart from each other in a circumferential direction. In a case where one of the above two driving electrodes 13a, 13a (for example, the driving electrode 13a disposed in the direction of twelve o'clock in FIG. 1) is set as a reference electrode, two monitor electrodes 13h, 13h are disposed 90° and 270° apart from the driving electrode 13a in the circumferential direction. Assume that the plane of the ring-shaped vibrating body on which a piezoelectric element is disposed, in other words, the drawing sheet of FIG. 1, is an X-Y plane. In this case, first detection electrodes 13b, 13c are disposed 0°, 60°, 120°, 180°, 240°, and 300° apart from the reference electrode in the circumferential direction. Each of the first detection electrodes 13b, 13c detects a secondary vibration generated when an angular velocity about the X axis is applied to the ring-shaped vibrating gyroscope 100. Similarly, second detection electrodes 13d, 13e are disposed 30°, 90°, 150°, 210°, 270°, and 330° apart from the reference electrode in the circumferential direction. Each of the second detection electrodes 13d, 13e detects a secondary vibration generated when an angular velocity about the Y axis is applied to the ring-shaped vibrating gyroscope 100. Further, third detection electrodes 13f, 13g are disposed, each of which detects a secondary vibration generated when an angular velocity about the Z axis, that is, an axis perpendicular to the plane on which the ring-shaped vibrating gyroscope 100 shown in FIG. 1 is disposed (namely, an axis perpendicular to the drawing sheet, which is hereinafter referred to simply as a "perpendicular axis" or the "Z axis"), is applied to the ring-shaped vibrating gyroscope 100.

In the present embodiment, the lower-layer metallic film 30 and the upper-layer metallic film 50 are 100 nm thick, respectively, and the piezoelectric film 40 is 3 μm thick. The silicon substrate 10 is 100 μm thick.

In the present embodiment and other embodiments to be described later, there are two categorized portions in which the respective electrodes are disposed. One of the portions is referred to as a first electrode disposition portion, in which the respective driving electrodes 13a and the third detection electrodes 13f, 13g are disposed, which includes a region from the outer peripheral edge of the upper surface of the ring-shaped vibrating body 11 to a vicinity of the outer peripheral edge and/or a region from the inner peripheral edge thereof to a vicinity of the inner peripheral edge. Another one of the two portions is referred to as a second electrode disposition portion, in which the first detection electrodes 13b, 13c and the second detection electrodes 13d, 13e are disposed, which is located on the upper surface of the ring-shaped vibrating body 11 so as not to be electrically connected to the first electrode disposition portion.

A second structure includes leg portions 15, ..., 15 that are each connected to a part of the ring-shaped vibrating body 11. These leg portions 15, ..., 15 are also formed with the silicon substrate 10. Formed on the entire upper surfaces of the leg portions 15, ..., 15 are the silicon oxide film 20, the lower-layer metallic film 30, and the piezoelectric film 40 described above which are provided continuously to the portions of the respective films on the ring-shaped vibrating body 11. Further formed on the upper surface of the piezoelectric film 40 is the upper-layer metallic film 50 which serves as metal tracks 14, ..., 14 of approximately 8 μm wide.

In the present embodiment, the plurality of metal tracks 14 are formed on four leg portions 15, 15 out of the sixteen leg portions 15, ..., 15. These metal tracks 14 are formed to obtain paths to electrode pads 18 on a post 19 from the respective electrodes that are disposed in the region from the outer peripheral edge of the ring-shaped vibrating body 11 to the vicinity of the outer peripheral edge. Particularly in the present embodiment, the metal tracks 14, 14 are provided from both ends of each of the second detection electrodes 13d, 13e so as to eliminate variations in electrical signals from the second detection electrodes 13d, 13e. The function of the vibrating gyroscope is not affected even in a case where the metal tracks 14, 14 are provided only from one of the ends of the respective second detection electrodes 13d, 13e.

A third structure includes the post 19 that is formed with the silicon substrate 10 provided continuously to the portions of the above leg portions 15, ..., 15. In the present embodiment, the post 19 is connected to a package portion (not shown) of the ring-shaped vibrating gyroscope 100 and serves as a fixed end. The post 19 is provided with the electrode pads 18, ..., 18. As shown in FIG. 2, formed on the upper surface of the post 19 are the silicon oxide film 20, the lower-layer metallic film 30, and the piezoelectric film 40 described above, which are provided continuously to the portions of the respective films on the leg portions 15, ..., 15 except for the portion of the fixed potential electrode 16 that functions as the ground electrode. In this case, the lower-layer metallic film 30 formed on the silicon oxide film 20 functions as the fixed potential electrode 16. On the upper surface of the piezoelectric film 40 formed above the post 19, there are formed the metal tracks 14, ..., 14 as well as the electrode pads 18, ..., 18 which are provided continuously to the portions of the metal tracks on the leg portions 15, ..., 15.

Described next with reference to FIGS. 3A to 3F is a method for manufacturing the ring-shaped vibrating gyroscope 100 according to the present embodiment. FIGS. 3A to 3F are cross sectional views each showing a part of the portion shown in FIG. 2.

Figure 3A:
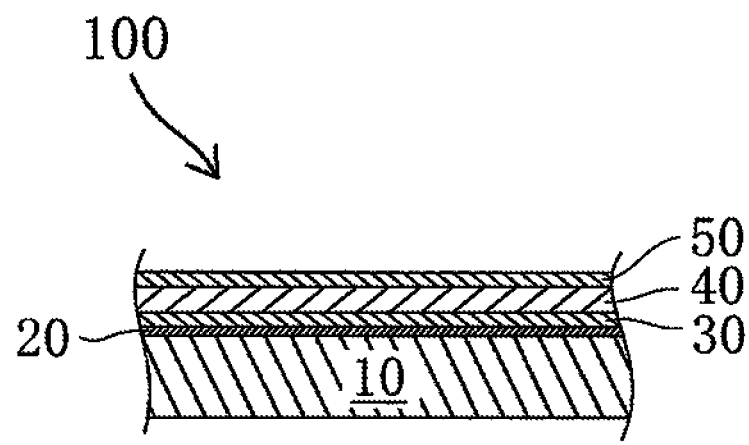
FIG. 3A is a cross sectional view showing a process in the steps of manufacturing a part of the ring-shaped vibrating gyroscope according to the embodiment of the present invention.
Figure 3B:
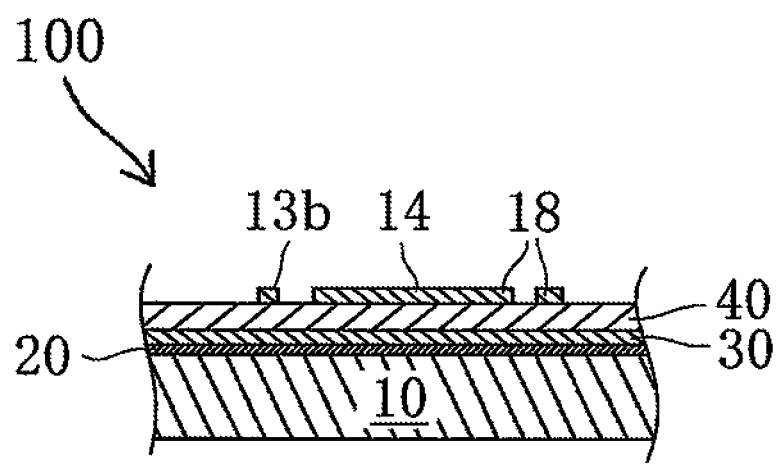
FIG. 3B is a cross sectional view showing a process in the steps of manufacturing the part of the ring-shaped vibrating gyroscope according to the embodiment of the present invention.

Firstly, as shown in FIG. 3A, laminated on the silicon substrate 10 are the silicon oxide film 20, the lower-layer metallic film 30, the piezoelectric film 40, and the upper-layer metallic film 50. Each of these films is formed by known film formation means. In the present embodiment, the silicon oxide film 20 is a thermally oxidized film obtained by known means. The lower-layer metallic film 30, the piezoelectric film 40, and the upper-layer metallic film 50 are each formed in accordance with a known sputtering method. It is noted that formation of each of these films is not limited to the above example but these films may be alternatively formed by any other known means.

The upper-layer metallic film 50 is then partially etched. In the present embodiment, there is formed a known resist film on the upper-layer metallic film 50, and dry etching is then performed on the basis of a pattern formed in accordance with the photolithographic technique, so that formed are the respective electrodes shown in FIG. 3B. In this case, the upper-layer metallic film 50 is dry etched under the condition for the known reactive ion etching (Rip using argon (Ar) or mixed gas containing argon (Ar) and oxygen ($O_2$).

Figure 3C:
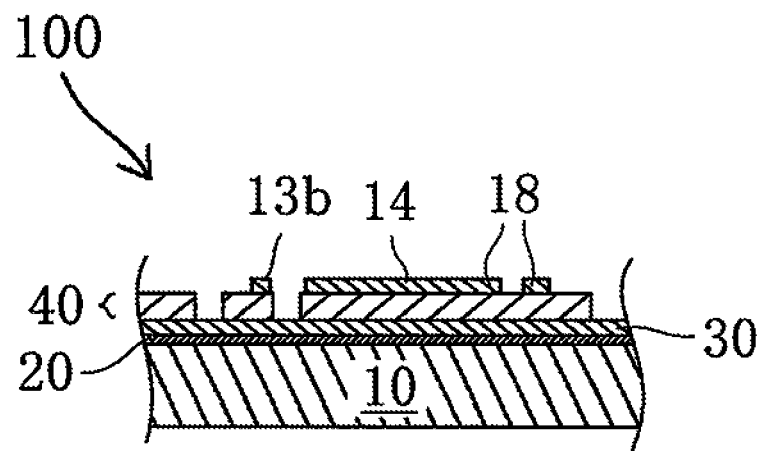
FIG. 3C is a cross sectional view showing a process in the steps of manufacturing the part of the ring-shaped vibrating gyroscope according to the embodiment of the present invention.

Thereafter, as shown in FIG. 3C, the piezoelectric film 40 is partially etched. Firstly, similarly to the above, the piezoelectric film 40 is dry etched on the basis of the resist film that is patterned in accordance with the photolithographic technique. In the present embodiment, the piezoelectric film 40 is dry etched under the condition for the known reactive ion etching (RIE) using mixed gas containing argon (Ar) and $C_2F_6$ gas, or mixed gas containing argon (Ar), $C_2F_6$ gas, and $CHF_3$ gas.

Figure 3D:
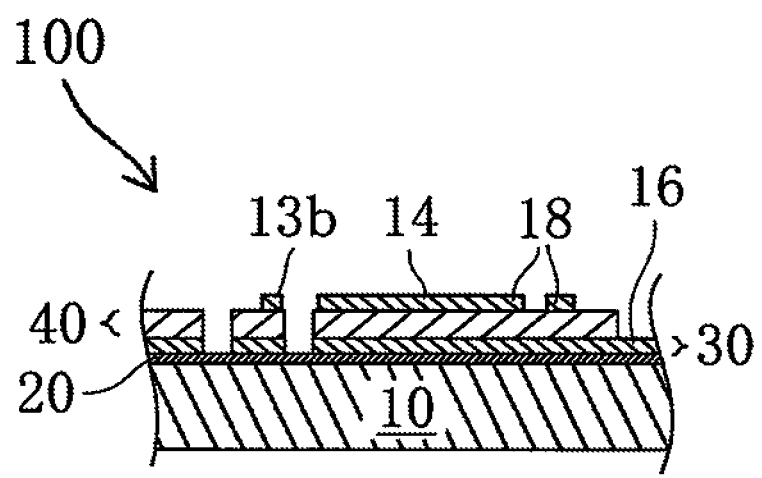
FIG. 3D is a cross sectional view showing a process in the steps of manufacturing the part of the ring-shaped vibrating gyroscope according to the embodiment of the present invention.

Then, as shown in FIG. 3D, the lower-layer metallic film 30 is partially etched. In the present embodiment, dry etching is performed using the resist film that is again patterned in accordance with the photolithographic technique, so as to form the fixed potential electrode 16 utilizing the lower-layer metallic film 30. In the present embodiment, the fixed potential electrode 16 is used as the ground electrode. In the present embodiment, the lower-layer metallic film 30 is dry etched under the condition for the known reactive ion etching (RIE) using argon (Ar) or mixed gas containing argon (Ar) and oxygen ($O_2$).

In the present embodiment, the resist film is formed to be approximately 4 μm thick so that the silicon oxide film 20 and the silicon substrate 10 are thereafter continuously etched with the above resist film formed again serving as an etching mask. However, even in a case where this resist film disappears during etching the silicon substrate 10, the selectivity of the etching rate relative to an etchant applied to the silicon substrate 10 functions advantageously. Therefore, the performance of any one of the upper-layer metallic film 50, the piezoelectric film 40, and the lower-layer metallic film 30 is not substantially affected by the above etching. In other words, in the present embodiment, since the ring-shaped vibrating body 11 is formed with the silicon substrate, it is possible to apply the known silicon trench etching technique with an adequately high selectivity with respect to the resist film. Even in a case where the resist film disappears, there is provided an adequate selectivity such that the upper-layer metallic film or the piezoelectric film provided therebelow serves as a mask for etching silicon.

Figure 3E:
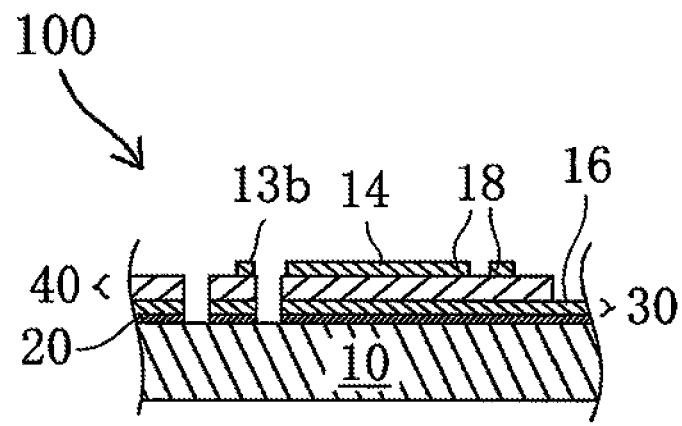
FIG. 3E is a cross sectional view showing a process in the steps of manufacturing the part of the ring-shaped vibrating gyroscope according to the embodiment of the present invention.
Figure 3F:
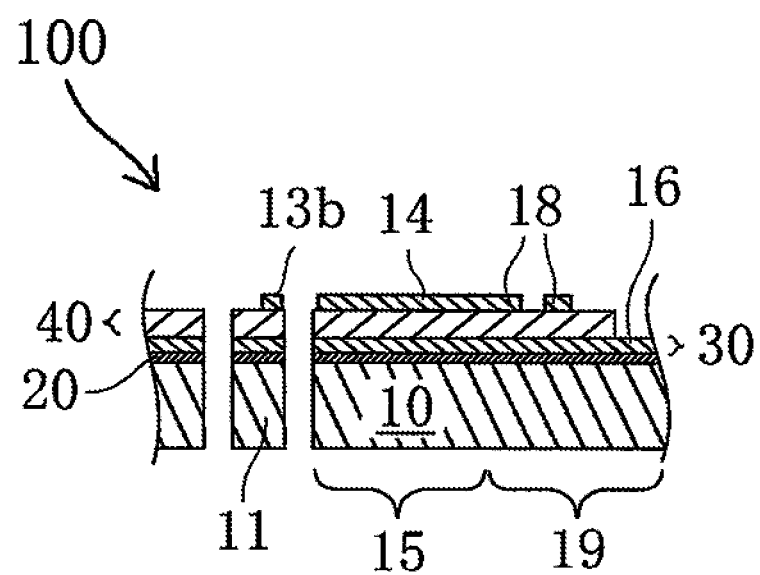
FIG. 3F is a cross sectional view showing a process in the steps of manufacturing the part of the ring-shaped vibrating gyroscope according to the embodiment of the present invention.

Thereafter, as shown in FIGS. 3E and 3F, the silicon oxide film 20 and the silicon substrate 10 are dry etched as described above using the resist film that is provided for etching the lower-layer metallic film 30. In the present embodiment, the silicon oxide film 20 was dry etched under the condition for the known reactive ion etching (RIE) using argon (Ar) or mixed gas containing argon (Ar) and oxygen ($O_2$). The known silicon trench etching technique is applied to the dry etching of the silicon substrate 10 in the present embodiment. In this case, the silicon substrate 10 is etched so as to be penetrated. Thus, the dry etching described above is performed in a state where a protective substrate, which prevents a stage to allow the silicon substrate 10 to be mounted thereon from being exposed to plasma upon penetration, is attached to the silicon substrate 10 with grease of high thermal conductivity serving as a lower layer of the silicon substrate 10. Accordingly, it is a preferable aspect to adopt the dry etching technique described in Japanese Unexamined Patent Publication No. 2002-158214, for example, in order to prevent corrosion of a plane perpendicular to the thickness direction of the silicon substrate 10, that is, an etching side surface, after the penetration.

As described above, the silicon substrate 10 and the respective films laminated on the silicon substrate 10 are etched to form the main structural portion of the ring-shaped vibrating gyroscope 100. Subsequently performed are the steps of accommodating the main structural portion into the package by known means as well as wiring. As a result, there is formed the ring-shaped vibrating gyroscope 100. Therefore, this vibrating gyroscope 100, which has no piezoelectric element on a side surface of the ring-shaped vibrating body 11, realizes excitation of an in-plane primary vibration as well as detection of a maximally triaxial out-of-plane and in-plane secondary vibrations with use of only the piezoelectric element formed on the plane of the ring-shaped vibrating body 11. As a result, it is possible to manufacture the vibrating gyroscope 100 in accordance with the above dry process technique that realizes low cost mass production with a high degree of accuracy.

Described below are the functions of the respective electrodes included in the ring-shaped vibrating gyroscope 100. As already described, excited in the present embodiment is the primary vibration in an in-plane vibration mode of cos 2θ. As the lower-layer metallic film 30 is formed continuously to the fixed potential electrode 16 being grounded, the lower-layer metallic film 30 is uniformly set to 0 V.

As shown in FIG. 1, firstly, an alternating-current voltage of 1 $V_{P-0}$ is applied to each of the two driving electrodes 13a, 13a. As a result, the piezoelectric film 40 is expanded and contracted to excite the primary vibration. In the present embodiment, the upper-layer metallic film 50 is formed outside the center line in the upper surface of the ring-shaped vibrating body 11. Accordingly, it is possible to convert the expansion/contraction motions of the piezoelectric film 40 into the primary vibration of the ring-shaped vibrating body 11 with no upper-layer metallic film 50 being provided on a side surface of the ring-shaped vibrating body 11. Actual alternating-current power supplies 12 each apply to the corresponding driving electrode 13a by way of the corresponding electrode pad 18 that is connected to a conductive wire. However, the alternating-current power supplies 12 are not referred to in the present embodiment and in the other embodiments, for the purpose of easier description.

Then, each of the monitor electrodes 13h, 13h shown in FIG. 1 detects an amplitude and a resonant frequency of the above primary vibration, and transmits a signal to a known feedback control circuit (not shown). The feedback control circuit in the present embodiment controls using the signals from the monitor electrodes 13h, 13h such that the frequency of the alternating-current voltage applied to each of the driving electrodes 13a, 13a is equal to the natural frequency of the ring-shaped vibrating body 11, as well as such that the amplitude of the ring-shaped vibrating body 11 has a constant value. As a result, the ring-shaped vibrating body 11 is vibrated constantly and continuously.

After the excitation of the primary vibration described above, upon application of an angular velocity about the perpendicular axis (Z axis), in the present embodiment in the in-plane vibration mode of cos 2θ, generated by a coriolis force is a secondary vibration indicated in FIG. 9B having a new vibration axis that is inclined at 45° in either side with respect to the vibration axis of the primary vibration indicated in FIG. 9A.

This secondary vibration is detected by the two detection electrodes (third detection electrodes) 13f, 13f as well as by the two other detection electrodes (third detection electrodes) 13g, 13g. In the present embodiment, as shown in FIG. 1, the respective detection electrodes 13f, 13g are disposed in correspondence with the vibration axis of the in-plane secondary vibration. Moreover, the respective detection electrodes 13f, 13g are formed inside the center line in the upper surface of the ring-shaped vibrating body 11. Therefore, the respective detection electrodes 13f, 13g generate electrical signals of positive/negative polarities inverse to each other in accordance with the in-plane secondary vibration excited upon the application of the angular velocity. As shown in FIG. 9C, when, for example, the ring-shaped vibrating body 11 is transformed into a vibration state shown as a vibrating body 11a in a vertically longer elliptical shape, the piezoelectric film 40 at the angle of the third detection electrode 13f disposed inside the center line is contracted in directions indicated by arrows $A_1$, while the piezoelectric film 40 at the angle of the third detection electrode 13g disposed inside the center line is expanded in directions indicated by arrows $A_2$. Accordingly, the electrical signals of these electrodes have positive/negative polarities inverse to each other. Similarly, when the ring-shaped vibrating body 11 is transformed into a vibration state shown as a ring-shaped vibrating body 11b in a horizontally longer elliptical shape, the piezoelectric film 40 at the angle of the third detection electrode 13f is expanded in directions indicated by arrows $B_1$, while the piezoelectric film 40 at the angle of the third detection electrode 13g is contracted in directions indicated by arrows $B_2$. Accordingly, also in this case, the electrical signals of these electrodes have positive/negative polarities inverse to each other.

Then, obtained in an arithmetic circuit functioning as a known difference circuit are differences between the electrical signals of the respective third detection electrodes 13f, 13g. Resulting detection signals of this case have approximately doubled detectability in comparison to the case with only one kind of the detection electrodes.

Described below is a case where an angular velocity is applied about the X axis after the excitation of the primary vibration described above. Excited in this case is the secondary vibration in the vibration mode of cos 3θ as indicated in FIG. 9D.

This secondary vibration is detected by the three detection electrodes (first detection electrodes) 13b, 13b, 13b as well as by the three other detection electrodes (first detection electrodes) 13c, 13c, 13c. In the present embodiment, as shown in FIG. 1, the respective detection electrodes 13b, 13c are disposed in correspondence with the vibration axis of the secondary vibration in the out-of-plane mode of cos 3θ. In the present embodiment, the respective detection electrodes 13b, 13c are formed outside or inside the center line in the upper surface of the ring-shaped vibrating body 11. However, the present invention is not limited to such a case. It is rather a preferable aspect to dispose the respective detection electrodes 13b, 13c so as to include the center line, in which state the piezoelectric film is least deformed by the in-plane primary vibration or the secondary vibration with respect to the Z axis. Because of the disposition of the respective detection electrodes 13b, 13c in the present embodiment, the respective detection electrodes 13b, 13c generate electrical signals of positive/negative polarities inverse to each other in accordance with the out-of-plane secondary vibration excited upon the application of the angular velocity.

Similarly to the above, thus obtained in the arithmetic circuit functioning as a known difference circuit are differences between the electrical signals of the respective detection electrodes 13b, 13c. Resulting detection signals of this case have approximately doubled detectability in comparison to the case with only one kind of the detection electrodes.

Described below is a case where an angular velocity is applied about the Y axis after the excitation of the primary vibration described above. Excited in this case is the secondary vibration in the vibration mode of cos 3θ indicated in FIG. 9E. This secondary vibration is in another out-of-plane vibration mode of cos 3θ which has a vibration axis 30° apart from that of the vibration mode of cos 3θ indicated in FIG. 9H.

This secondary vibration is detected by the three detection electrodes (second detection electrodes) 13d, 13d, 13d as well as by the three other detection electrodes (second detection electrodes) 13e, 13e, 13e. In the present embodiment, as shown in FIG. 1, the respective detection electrodes 13d, 13e are disposed in correspondence with the vibration axis of the out-of-plane secondary vibration. In the present embodiment, the respective detection electrodes 13d, 13e are formed outside the center line in the upper surface of the ring-shaped vibrating body 11. However, the present invention is not limited to such a case. It is rather a preferable aspect to dispose the respective detection electrodes 13d, 13e so as to include the center line, in which state the piezoelectric film is least deformed by the in-plane primary vibration or the secondary vibration with respect to the Z axis. With the disposition of the respective detection electrodes 13d, 13e in the present embodiment, the respective detection electrodes 13d, 13e generate electrical signals of positive/negative polarities inverse to each other in accordance with the out-of-plane secondary vibration excited upon the application of the angular velocity.

Similarly to the above, thus obtained in the arithmetic circuit functioning as a known difference circuit are differences between the electrical signals of the respective detection electrodes 13d, 13e. Resulting detection signals of this case have approximately doubled detectability in comparison to the case with only one kind of the detection electrodes.

In the first embodiment described above, for the purpose of easier description, the detection electrodes are referred to as the first detection electrodes to the third detection electrodes, each of which detects one axial component of a triaxial angular velocity to be detected. Alternatively, the detection electrodes for the respective axes may be each arbitrarily referred to as one of the first detection electrode to the third detection electrodes so as to be different from one another.

Modification (1) of First Embodiment

Figure 4:
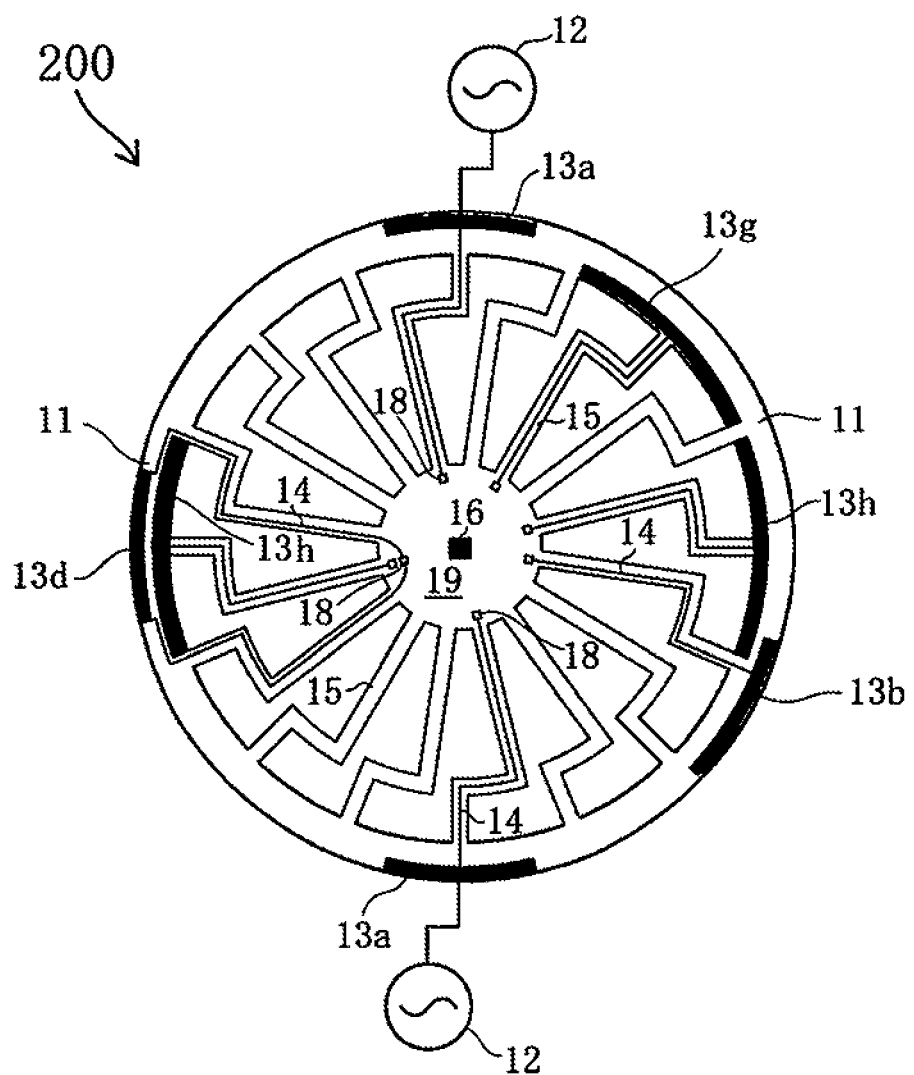
FIG. 4 is a front view of a structure having a principal function in a ring-shaped vibrating gyroscope according to another embodiment of the present invention.

FIG. 4 is a front view of a structure having a principal function in a ring-shaped vibrating gyroscope 200 obtained by partially modifying the first embodiment.

The ring-shaped vibrating gyroscope 200 according to the present embodiment is configured identically with the ring-shaped vibrating gyroscope 100 of the first embodiment, except for the upper-layer metallic film 50 in the first embodiment. The manufacturing method therefor is identical with that of the first embodiment except for some steps. The vibration modes of the primary vibration and the secondary vibration in the present embodiment are identical with those of the first embodiment. Accordingly, the description duplicating with that of the first embodiment will not be repeatedly provided.

As shown in FIG. 4, the ring-shaped vibrating gyroscope 200 according to the present embodiment includes three detection electrodes 13b, 13d, 13g. The effect of the present invention is substantially exerted even with such disposition of the respective detection electrodes. More specifically, provision of the respective detection electrodes 13b, 13d, 13g achieves detection of an angular velocity by adopting the triaxial angular velocity, namely, detection of an angular velocity by adopting the biaxial (the X axis and the Y axis) out-of-plane vibration mode as well as detection of an angular velocity by adopting the uniaxial (the Z axis) in-plane vibration mode. The present embodiment realizes simplification of the circuit as the difference circuit used in the first embodiment is not required. However, detectability of the present embodiment is not as good as that of the first embodiment since there are provided the only three detection electrodes 13b, 13d, 13g, each of which has an area equal to that of the first embodiment.

As the respective electrodes of the present embodiment are eccentrically located, some of the leg portions 15 are not provided with the metal tracks 14. However, the present invention is not limited to such a case. An effect similar to that of the present embodiment is exerted even in a case where the leg portions 15 not provided with the metal tracks 14 are removed. However, random absence of the leg portions 15 may cause irregular vibration of the ring-shaped vibrating body 11. It is therefore preferable to remove only the leg portions 15 that are allocated at equal angles.

Modification (2) of First Embodiment

Figure 5:
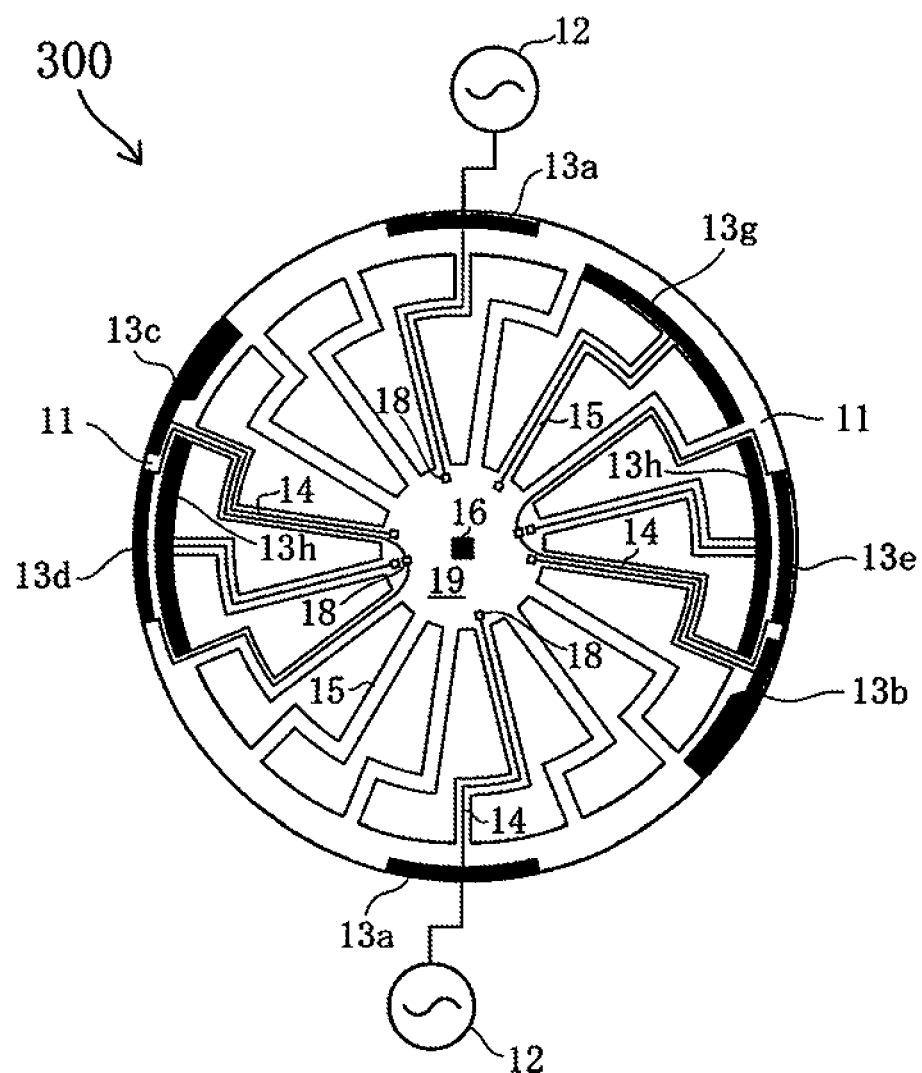
FIG. 5 is a front view of a structure having a principal function in a ring-shaped vibrating gyroscope according to still another embodiment of the present invention.

FIG. 5 is a front view of a structure having a principal function in a ring-shaped vibrating gyroscope 300 obtained by partially modifying the first embodiment.

The ring-shaped vibrating gyroscope 300 according to the present embodiment is configured identically with the ring-shaped vibrating gyroscope 100 of the first embodiment, except for the upper-layer metallic film 50 in the first embodiment. The manufacturing method therefor is identical with that of the first embodiment except for some steps. The vibration modes of the primary vibration and the secondary vibration in the present embodiment are identical with those of the first embodiment. Accordingly, the description duplicating with that of the first embodiment will not be repeatedly provided.

As shown in FIG. 5, the ring-shaped vibrating gyroscope 300 according to the present embodiment includes the five detection electrodes 13b, 13c, 13d, 13e, 13g. Further, as shown in FIG. 5, each of the first detection electrodes 13b, 130 has the electrode portion beyond the center line. Even with such disposition of the respective detection electrodes, there is substantially exerted the effect of the present invention. More specifically, provision of the respective detection electrodes 13b, 13; 13d, 13e, 13g achieves detection of an angular velocity by adopting the triaxial angular velocity, namely, detection of an angular velocity by adopting the biaxial (the X axis and the Y axis) out-of-plane vibration mode as well as detection of an angular velocity by adopting the uniaxial (the Z axis) in-plane vibration mode. In particular, it is a preferable aspect to dispose the respective first detection electrodes 13b, 13c so as to include the center line, in which state the piezoelectric film is least deformed by the primary vibration and the secondary vibration in the in-plane vibration mode. Furthermore, it is a more preferable aspect to dispose the respective first detection electrodes 13b, 13c so as to be symmetrical with respect to the center line, in which state the first detection electrodes 13b, 13c are deformed in directions opposite to each other with respect to the center line in the in-plane vibration mode.

Even in a case where the plurality of first detection electrodes 13b, 13c are not disposed symmetrically with respect to the center line, the respective first detection electrodes 13b, 13c may be disposed in various ways so as to be unlikely to detect a vibration in an in-plane vibration mode in accordance with the vibration mode to be adopted. Accordingly, as described earlier, the second electrode disposition portion including the respective detection electrodes 13b, 13c, 13d, 13e is defined as a portion on the upper surface of the ring-shaped vibrating body 11 not electrically connected to the first electrode disposition portion.

In the present embodiment, each of the first detection electrodes 13b, 13c occupies an area larger than that of the first embodiment, so that detectability thereof is improved in comparison to that of the modification (2) of the first embodiment. The first detection electrodes 13b, 13c are preferably disposed symmetrically with respect to the vibration axis. Further, the areas of only the first detection electrodes 13b, 13c are increased in the present embodiment. However, the present invention is not limited to such a case. For example, it is a preferable aspect to increase the area of the driving electrode, the monitor electrode, or the detection electrode different from the above, so as to improve the driving power or the detectability.

As the respective electrodes of the present embodiment are eccentrically located, some of the leg portions 15 are not provided with the metal tracks 14. However, the present invention is not limited to such a case. An effect similar to that of the present embodiment is exerted even in a case where the leg portions 15 not provided with the metal tracks 14 are removed. However, random absence of the leg portions 15 may cause irregular vibration of the ring-shaped vibrating body 11. It is therefore preferable to remove only the leg portions 15 that are allocated at equal angles.

Modification (3) of First Embodiment

Figure 6:
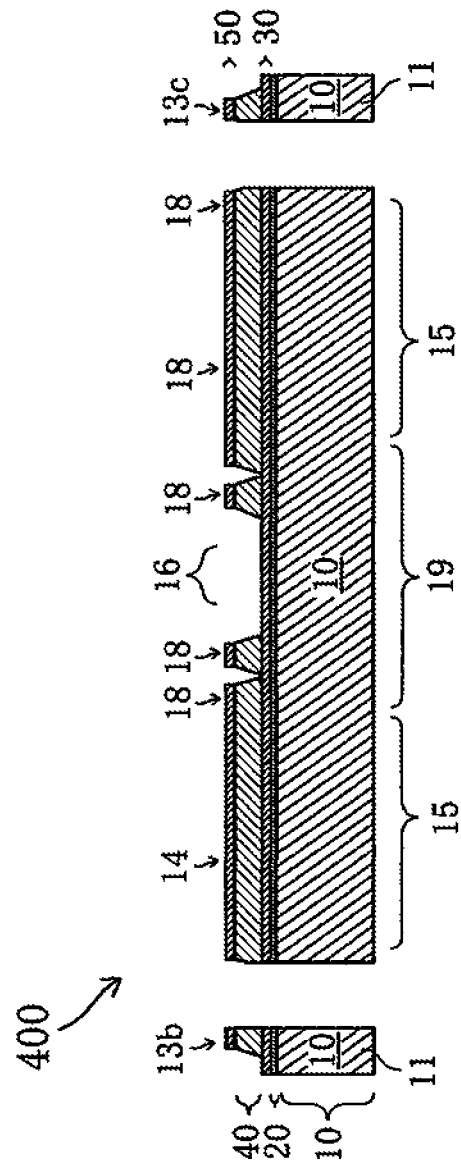
FIG. 6 is a cross sectional view, which corresponds to FIG. 2, of a structure having a principal function in a ring-shaped vibrating gyroscope according to a different embodiment of the present invention.

FIG. 6 is a cross sectional view, which corresponds to FIG. 2, of a structure having a principal function in a ring-shaped vibrating gyroscope 400 obtained by partially modifying the first embodiment.

As shown in FIG. 6, in the present embodiment, the piezoelectric film 40 is etched in correspondence with the region where the upper-layer metallic film 50 is substantially formed. The alternating-current voltage applied to the upper-layer metallic film 50 is thus applied only in the vertically downward direction with no influence of the region provided with the lower-layer metallic film 30. Therefore prevented are undesired expansion and contraction motions of the piezoelectric film 40 as well as transmission of an electrical signal. In the present embodiment, after the step of dry etching the upper-layer metallic film 50, dry etching is subsequently performed under the condition same as that of the first embodiment with the residual resist film on the upper-layer metallic film 50 or the upper-layer metallic film 50 itself serving as an etching mask. As a result, there is formed the piezoelectric film 40 described above. Further, as shown in FIG. 6, the piezoelectric film 40 is etched so as to be inclined (at an inclination angle of 75°, for example) in the present embodiment. However, the piezoelectric film 40 steeply inclined as shown in FIG. 6 is dealt in the present application as being substantially visually unrecognized, with respect to other regions, in the front view of the ring-shaped vibrating gyroscope 200 shown in FIG. 5. Furthermore, the aspect disclosed in the present embodiment in which the piezoelectric film 40 is etched is applicable at least to all the embodiments of the present application.

Modification (4) of First Embodiment

Described above in each of the first embodiment and the modifications (1) to (3) thereof is the configuration of the vibrating gyroscope that is capable of detecting a triaxial angular velocity. Also obtained from the first embodiment is the disposition of respective detection electrodes for detecting a biaxial or uniaxial angular velocity.

For example, when only the first detection electrodes 13b, 13c used for measuring an angular velocity with respect to the X axis and the second detection electrodes 13d, 13e used for measuring an angular velocity with respect to the Y axis, out of the first to third detection electrodes 13b, 13c, 13d, 13e, 13f, 13g, are disposed on the ring-shaped vibrating body 11, manufactured is a vibrating gyroscope for detection of a biaxial angular velocity. More specifically, it is possible to obtain the vibrating gyroscope for detection of a biaxial angular velocity by selecting the detection electrodes for two axes out of the first to third detection electrodes. As already described, the effect of the present invention is substantially exerted by disposing only one of the first detection electrodes (13b, for example) out of the respective first detection electrodes 13b, 13c.

An idea similar to the above is applicable to the configuration of a vibrating gyroscope that is capable of detecting a uniaxial angular velocity. For example, when only the first detection electrodes 13b, 13c used for measuring an angular velocity with respect to the X axis, out of the first to third detection electrodes 13b, 13c, 13d, 13e, 13f, 13g, are disposed on the ring-shaped vibrating body 11, manufactured is such a vibrating gyroscope for detection of a uniaxial angular velocity. It is possible to obtain a vibrating gyroscope for detection of a biaxial angular velocity by selectively adding a detection electrode for an arbitrary axis out of three axes (the X axis, the Y axis, and the Z axis) to the above vibrating gyroscope for detection of a uniaxial angular velocity. As already described, the effect of the present invention is substantially exerted by disposing only one of the first detection electrodes (13b, for example) out of the respective first detection electrodes 13b, 13c.

Modification (5) of First Embodiment

Figure 7:
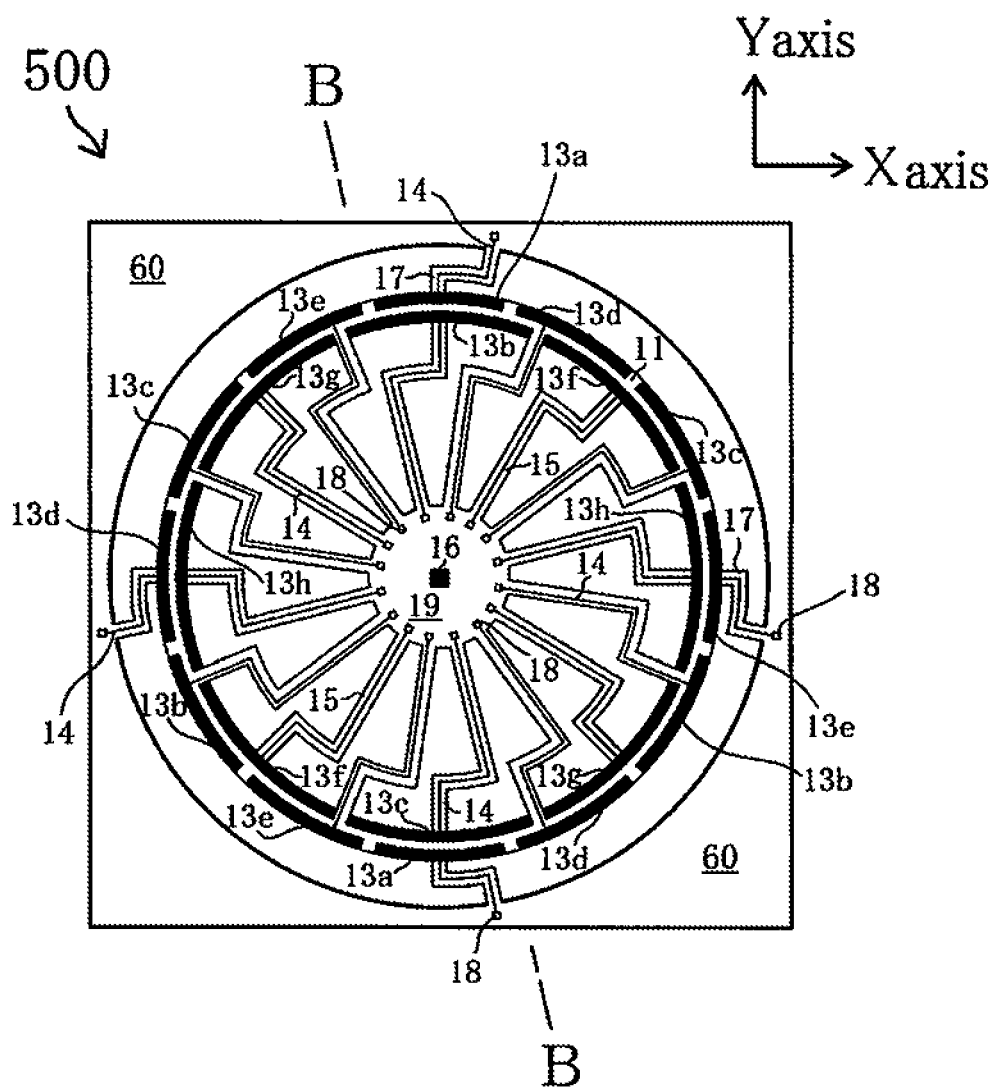
FIG. 7 is a front view of a structure having a principal function in a ring-shaped vibrating gyroscope according to a different embodiment of the present invention.

FIG. 7 is a front view of a structure having a principal function in a ring-shaped vibrating gyroscope 500 obtained by partially modifying the first embodiment. FIG. 8 is a cross sectional view taken along line B-B of FIG. 7.

In comparison to the first embodiment, the ring-shaped vibrating gyroscope 500 in the present embodiment is provided with a fixed end 60 around the ring-shaped vibrating body 11 by way of grooves or leg portions 17. Formed on the leg portions 17 and the fixed end 60 are electrode pads 18 and metal tracks 14 that are drawn from the driving electrodes 13a, 13a and the second detection electrodes 13d, 13e. Further, due to provision of the metal tracks 14 on the leg portions 17, there are not provided the metal tracks 14 and the electrode pads 18 on the leg portions 15 and the post 19, respectively. The ring-shaped vibrating gyroscope 500 in the present embodiment is configured identically with that of the first embodiment except for the above points. The manufacturing method therefor is identical with that of the first embodiment except for some steps. The vibration modes of the primary vibration and the secondary vibration in the present embodiment are identical with those of the first embodiment. Accordingly, the description duplicating with that of the first embodiment will not be repeatedly provided. Alternating-current power supplies to be connected with the driving electrodes 13a, 13a are not illustrated for easier comprehension of the figure.

Due to provision of the fixed end 60 and the leg portions 17 connecting the fixed end 60 and the ring-shaped vibrating body 11 in the ring-shaped vibrating gyroscope 500 of the present embodiment, it is unnecessary to dispose the plurality of metal tracks 14 on the leg portions 15 inside the ring-shaped vibrating body 11. Thus remarkably decreased are risks of short circuiting among the metal tracks by some defect in the manufacturing steps. As shown in FIG. 7, each of the metal tracks 14 is joined to the center portion in the longer side of the corresponding electrode, so that there are caused no variations in electrical signals from the first detection electrodes 13a-13a and the second detection electrodes 13d, 13e in the first embodiment. However, provision of the fixed end 60 increases the size of the vibrating gyroscope in comparison to that of the first embodiment.

Second Embodiment

Figure 10:
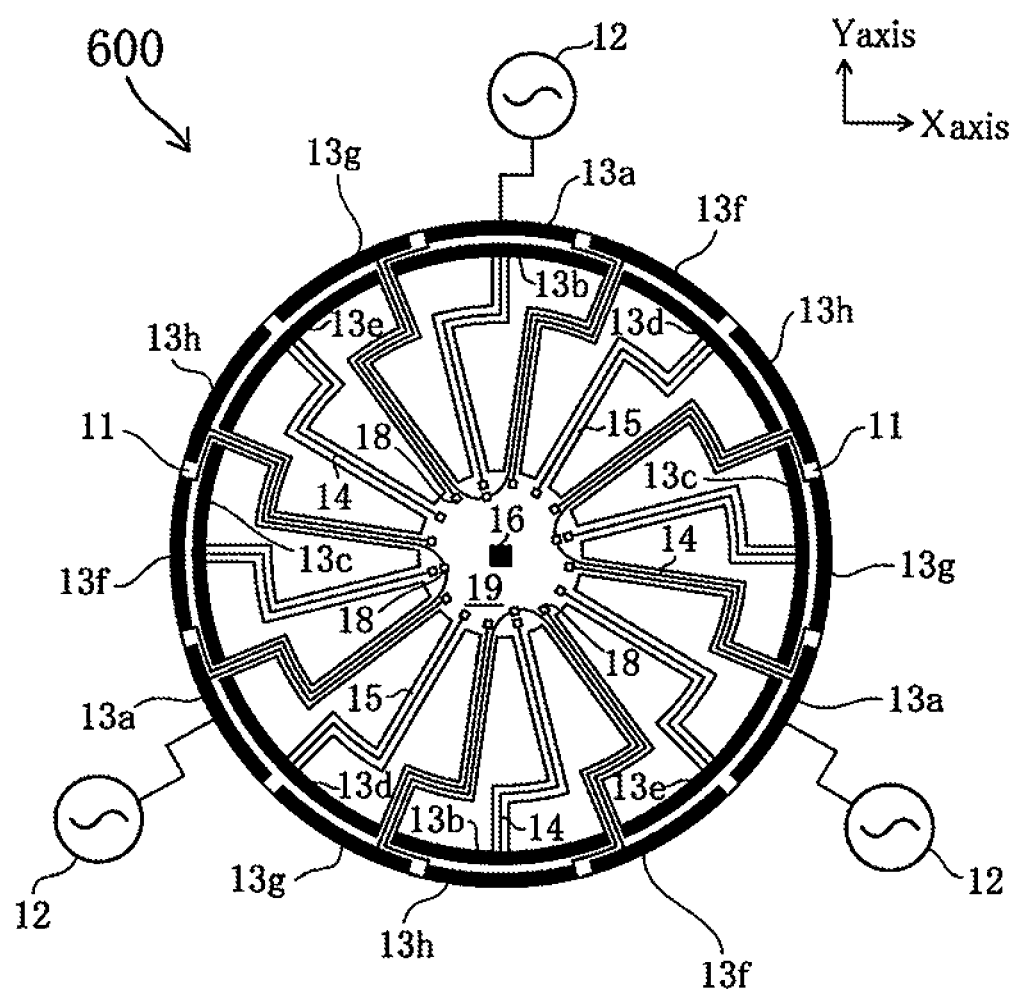
FIG. 10 is a front view of a structure having a principal function in a ring-shaped vibrating gyroscope according to a different embodiment of the present invention.

FIG. 10 is a front view of a structure having a principal function in a different ring-shaped vibrating gyroscope 600 for measuring a triaxial angular velocity according to the present embodiment.

Figure 11A:
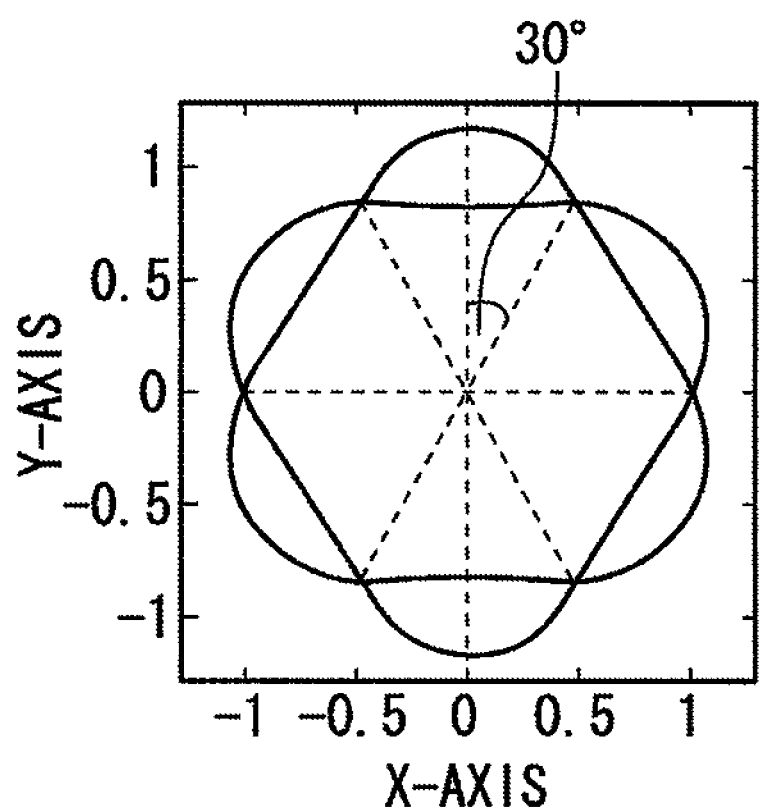
FIG. 11A is a view conceptually illustrating a primary vibration in a vibration mode of cos 3θ according to a different embodiment of the present invention.
Figure 11B:
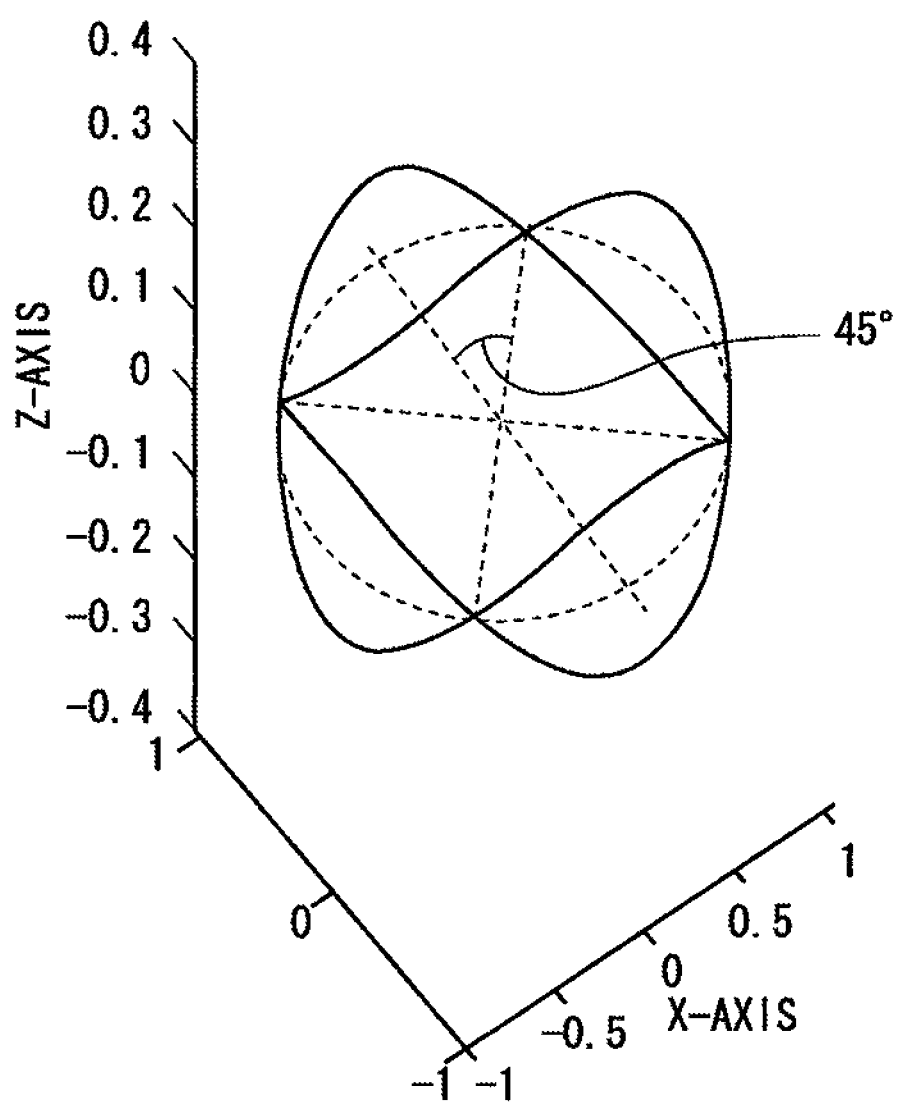
FIG. 11B is a view conceptually illustrating a secondary vibration in an out-of-plane vibration mode of cos 2θ in a case where an angular velocity is applied about an X axis, according to a different embodiment of the present invention.
Figure 11C:
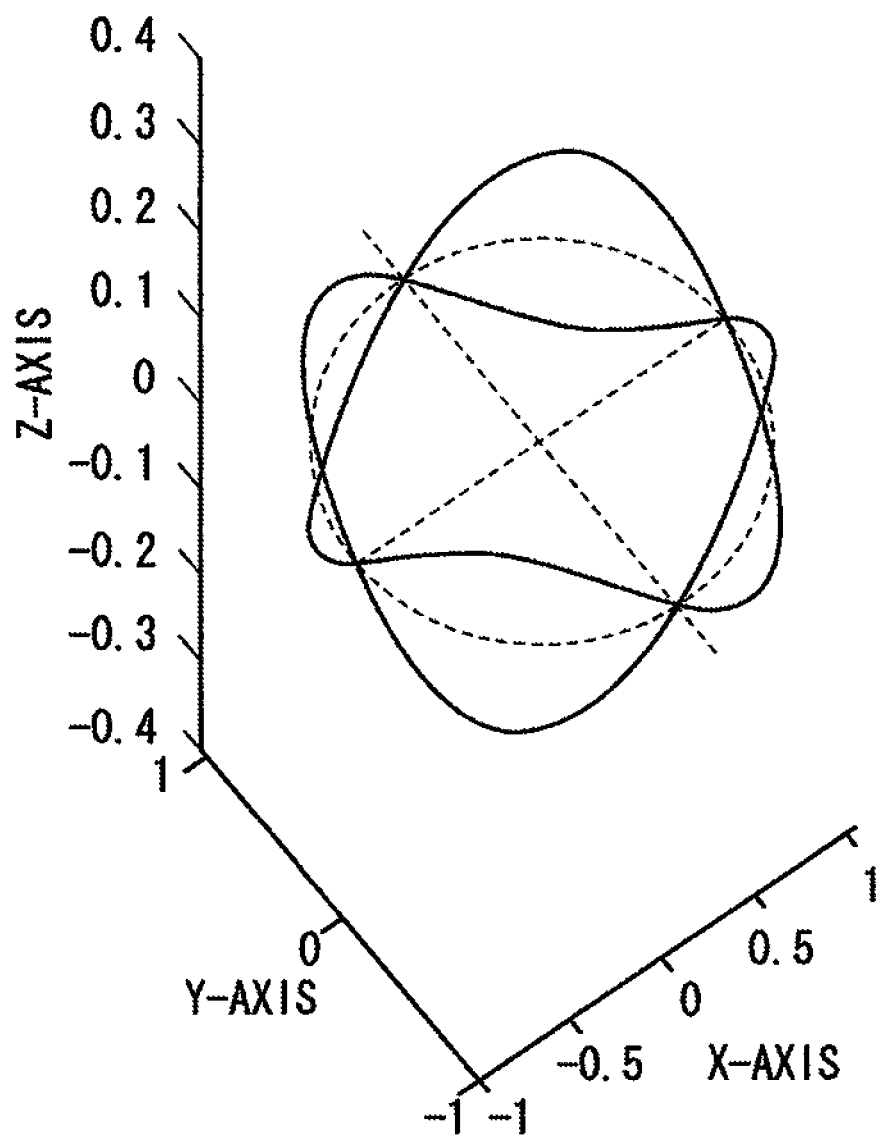
FIG. 11C is a view conceptually illustrating a secondary vibration in an out-of-plane vibration mode of cos 2θ in a case where an angular velocity is applied about a Y axis, according to a different embodiment of the present invention.
Figure 11D:
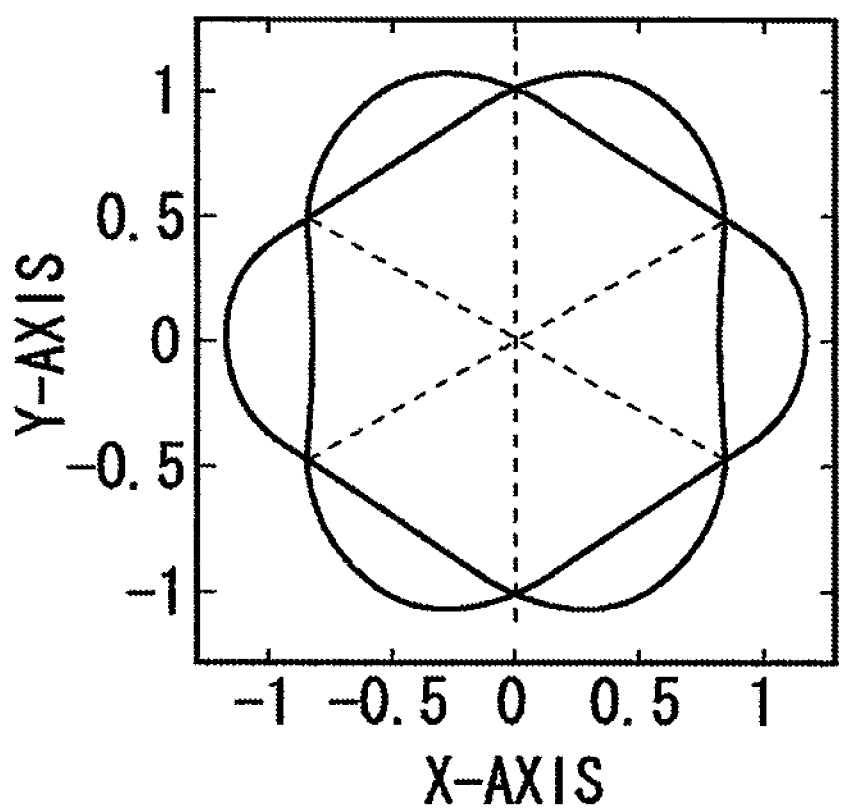
FIG. 11D is a view conceptually illustrating a secondary vibration in a vibration mode of cos 3θ in a case where an angular velocity is applied about a Z axis, according to a different embodiment of the present invention.

The ring-shaped vibrating gyroscope 600 according to the present embodiment is configured identically with the ring-shaped vibrating gyroscope 100 of the first embodiment except for the disposition of the driving electrodes 13a, the monitor electrodes 13h, and some of the detection electrodes out of the first detection electrodes 13b, 13c, the second detection electrodes 13d, 13e, and the third detection electrodes 13f, 13g in the first embodiment, as well as the disposition and the number of the alternating-current power supplies 12. The manufacturing method therefor is identical with that of the first embodiment. Accordingly, the description duplicating with that of the first embodiment will not be repeatedly provided. However, the primary vibration in the present embodiment has an in-plane vibration mode of cos 3θ as indicated in FIG. 11A. The secondary vibration in the present embodiment has an out-of-plane vibration mode of cos 2θ with respect to the X axis as indicated in FIG. 11B, an out-of-plane vibration mode of cos 2θ with respect to the Y axis as indicated in FIG. 11C, and an in-plane vibration mode of cos 3θ with respect to an axis (the Z axis) as indicated in FIG. 11D.

As shown in FIG. 10, also in the ring-shaped vibrating gyroscope 600 of the present embodiment, the upper-layer metallic film 50 configuring the plurality of electrodes 13a to 13h has an outer end formed inside by approximately 1 μm with respect to the outer peripheral edge of the ring-shaped vibrating body 11 that has a ring-shaped plane of approximately 40 μm wide, so as to be approximately 18 μm wide. The upper-layer metallic film 50 is provided outside or inside the center line.

In the present embodiment, excited to the ring-shaped vibrating gyroscope 600 is a primary vibration in an in-plane vibration mode of cos 3θ. On the other hand, a secondary vibration in the present embodiment has vibration modes indicated in FIGS. 11B to 11D. Accordingly, the plurality of electrodes 13a to 13h are categorized as follows. Firstly, there are the three driving electrodes 13a, 13a, 13a disposed 120° apart from each other in the circumferential direction. In a case where one of the above three driving electrodes 13a, 13a, 13a (for example, the driving electrode 13a disposed in the direction of twelve o'clock in FIG. 10) is set as a reference electrode, the three monitor electrodes 13h, 13h, 13h are disposed 60°, 180°, and 300° respectively apart from the driving electrode 13a in the circumferential direction. Assume that a plane provided with a piezoelectric element on the ring-shaped vibrating body, in other words, the drawing sheet of FIG. 10, is as an X-Y plane. In this case, the first detection electrodes 13b, 13c for detecting a secondary vibration generated when an angular velocity about the X axis is applied to the ring-shaped vibrating gyroscope 600 are disposed 0°, 90°, 180°, and 270° respectively apart from the reference electrode in the circumferential direction. Similarly, the second detection electrodes 13d, 13e for detecting a secondary vibration generated when an angular velocity about the Y axis is applied to the ring-shaped vibrating gyroscope 600 are disposed 45°, 135°, 225', and 315° respectively apart from the reference electrode in the circumferential direction. Further, the third detection electrodes 13f, 13g are disposed, each of which detects a secondary vibration generated when an angular velocity about the Z axis, that is, an axis perpendicular to the plane on which the ring-shaped vibrating gyroscope 600 shown in FIG. 10 is disposed (namely, an axis perpendicular to the drawing sheet, which is hereinafter referred to simply as a "perpendicular axis" or the "Z axis"), is applied to the ring-shaped vibrating gyroscope 600.

Described below are the functions of the respective electrodes included in the ring-shaped vibrating gyroscope 600. As already described, in the present embodiment, excited is the primary vibration in the in-plane vibration mode of cos 3θ. As the lower-layer metallic film 30 is formed continuously to the fixed potential electrode 16 being grounded, the lower-layer metallic film 30 is uniformly set to 0 V.

Firstly, as shown in FIG. 10, an alternating-current voltage of 1 $V_{P-0}$ is applied to each of the three driving electrodes 13a, 13a, 13a. As a result, the piezoelectric film 40 is expanded and contracted to excite the primary vibration. In the present embodiment, the upper-layer metallic film 50 is formed outside the center line in the upper surface of the ring-shaped vibrating body 11. Accordingly, it is possible to convert the expansion/contraction motions of the piezoelectric film 40 into the primary vibration of the ring-shaped vibrating body 11 with no upper-layer metallic film 50 being provided on a side surface of the ring-shaped vibrating body 11.

Then, each of the monitor electrodes 13h, 13h, 13h shown in FIG. 10 detects an amplitude and a resonant frequency of the above primary vibration, and transmits a signal to a known feedback control circuit (not shown). The feedback control circuit in the present embodiment controls using the signals from the monitor electrodes 13h, 13h, 13h such that the frequency of the alternating-current voltage applied to each of the driving electrodes 13a, 13a, 13a is equal to the natural frequency of the ring-shaped vibrating body 11, as well as such that the amplitude of the ring-shaped vibrating body 11 has a constant value. As a result, the ring-shaped vibrating body 11 is vibrated constantly and continuously.

After the excitation of the primary vibration described above, upon application of an angular velocity about the perpendicular axis (the Z axis), in the present embodiment in the in-plane vibration mode of cos 3θ, generated by a coriolis force is a secondary vibration indicated in FIG. 11I having a new vibration axis that is inclined at 30° in either side with respect to the vibration axis of the primary vibration indicated in FIG. 11A.

This secondary vibration is detected by the three detection electrodes (third detection electrodes) 13f, 13f, 13f as well as by the three other detection electrodes (third detection electrodes) 13g, 13g, 13g. In the present embodiment, similarly to the first embodiment, thus obtained in the arithmetic circuit functioning as a known difference circuit are differences between the electrical signals of the respective third detection electrodes 13f, 13g. Resulting detection signals of this case have approximately doubled detectability in comparison to the case with only one kind of the detection electrodes.

Described below is a case where an angular velocity is applied about the X axis after the excitation of the primary vibration described above. Excited in this case is the secondary vibration in the out-of-plane vibration mode of cos 2θ indicated in FIG. 11B.

This secondary vibration is detected by the two detection electrodes (first detection electrodes) 13b, 13b as well as by the two other detection electrodes (first detection electrodes) 13c, 13c. In the present embodiment, as shown in FIG. 10, the respective detection electrodes 13b, 13c are disposed in correspondence with the vibration axis of the out-of-plane secondary vibration. Moreover, the respective detection electrodes 13b, 13c in the present embodiment are formed inside the center line in the upper surface of the ring-shaped vibrating body 11. However, the present invention is not limited to such a case. It is rather a preferable aspect to dispose the respective detection electrodes 13b, 13c so as to include the center line, in which state the piezoelectric film is least deformed by the primary vibration and the secondary vibration in the in-plane vibration mode. Furthermore, it is a more preferable aspect to dispose the respective detection electrodes 13b, 13c so as to be symmetrical with respect to the center line, in which state the detection electrodes 13b, 13c are deformed in directions opposite to each other with respect to the center line in the in-plane vibration mode.

In the present embodiment, because of the disposition of the respective detection electrodes 13b, 13c, the detection electrodes 13b, 13c generate electrical signals of positive/negative polarities inverse to each other in accordance with the out-of-plane secondary vibration excited upon application of the angular velocity. Thus, similarly to the first embodiment, obtained in the arithmetic circuit functioning as a known difference circuit are differences between the electrical signals of the respective detection electrodes 13b, 13c. Resulting detection signals of this case have approximately doubled detectability in comparison to the case with only one kind of the detection electrodes.

Described below is a case where an angular velocity is applied about the Y axis after the excitation of the primary vibration described above. Excited in this case is the secondary vibration in the vibration mode of cos 2θ indicated in FIG. 11C, which has a vibration axis inclined at 45° from that of the vibration mode of cos 2θ described above.

This secondary vibration is detected by the two detection electrodes (second detection electrodes) 13d, 13d as well as by the two other detection electrodes (second detection electrodes) 13e, 13e. In the present embodiment, as shown in FIG. 1, the respective detection electrodes 13d, 13e are disposed in correspondence with the vibration axis of the out-of-plane secondary vibration. Moreover, the respective detection electrodes 13d, 13e in the present embodiment are formed inside the center line in the upper surface of the ring-shaped vibrating body 11. However, the present invention is not limited to such a case. It is rather a preferable aspect to dispose the respective detection electrodes 13d, 13e so as to include the center line, in which state the piezoelectric film is least deformed by the primary vibration and the secondary vibration in the in-plane vibration mode. Furthermore, it is a more preferable aspect to dispose the respective detection electrodes 13d, 13e so as to be symmetrical with respect to the center line, in which state the detection electrodes 13*d*, 13*e* are deformed in directions opposite to each other with respect to the center line in the in-plane vibration mode.

In the present embodiment, because of the disposition of the respective detection electrodes 13*d*, 13*e*, the detection electrodes 13*d*, 13*e* generate electrical signals of positive/negative polarities inverse to each other in accordance with the out-of-plane secondary vibration excited upon application of the angular velocity. Thus, similarly to the above case, obtained in the arithmetic circuit functioning as a known difference circuit are differences between the electrical signals of the respective detection electrodes 13*d*, 13*e*. Resulting detection signals of this case have approximately doubled detectability in comparison to the case with only one kind of the detection electrodes.

In the first embodiment described above, for the purpose of easier description, the detection electrodes are referred to as the first detection electrodes to the third detection electrodes, each of which detects one axial component of a triaxial angular velocity to be detected. Alternatively, the detection electrodes for the respective axes may be each arbitrarily referred to as one of the first detection electrode to the third detection electrodes so as to be different from one another.

In each of the first embodiment and the modifications (1) to (5) thereof, the monitor electrodes 13*h*, 13*h* are disposed at the identical positions or in the identical regions. However, the present invention is not limited to such a case. When N is a natural number of 2 or more or a natural number of 3 or more and M=0, 1, . . . , N−1 (hereinafter, always true in this paragraph), in a case where one of the driving electrodes 13*a* is set as a reference driving electrode, the monitor electrodes 13*h* are not necessarily disposed $[(360/N) \times \{M+(\frac{1}{2})\}]°$ apart from the reference driving electrode 13*a* in the circumferential direction. For example, in a vibration mode of cos Nθ, when L=0, 1, . . . , 2N−1 (hereinafter, always true in this paragraph), the monitor electrodes 13*h* are disposed so as not to be $[(180/N) \times \{L+(\frac{1}{2})\}]°$ apart from the reference driving electrode in the circumferential direction or are disposed so as not to be axisymmetrical with respect to the above angular positions. Moreover, the respective monitor electrodes 13*h* are disposed so as not to be symmetrical with respect to the center line. By the disposition of the respective monitor electrodes 13*h*, the effect of the first embodiment or any one of the modifications thereof is substantially exerted.

Figure 12A:
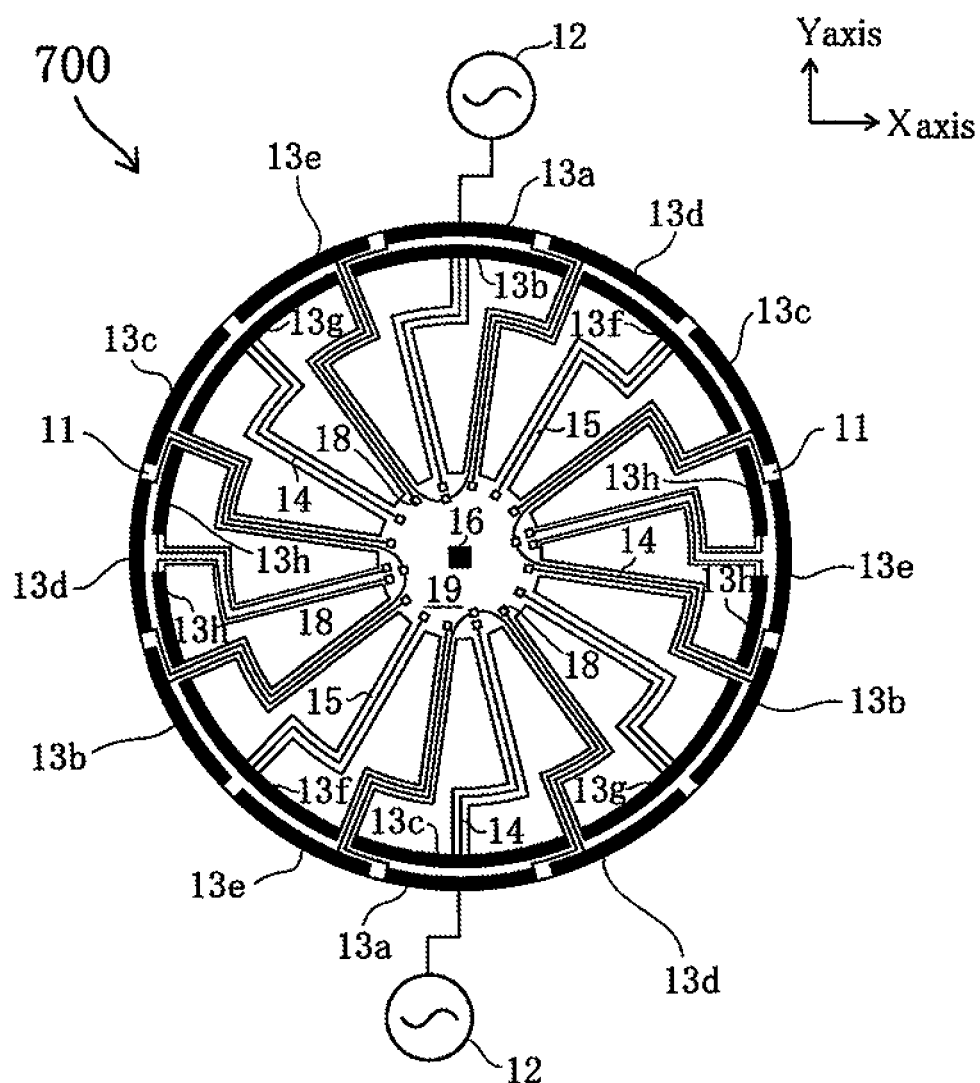
FIG. 12A is a front view of a structure having a principal function in a ring-shaped vibrating gyroscope according to a different embodiment of the present invention.
Figure 12B:
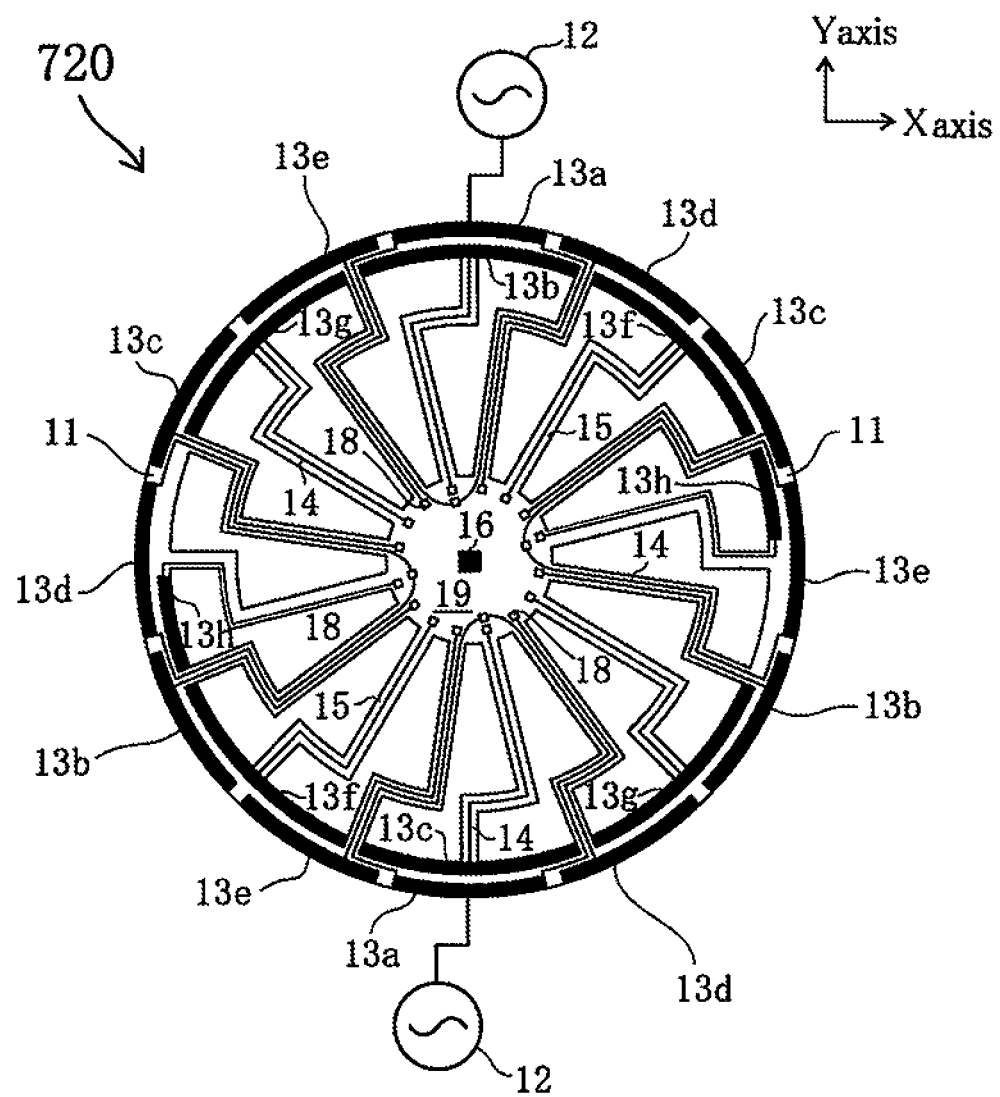
FIG. 12B is a front view of a structure having a principal function in a ring-shaped vibrating gyroscope according to a different embodiment of the present invention.

One specific example of the above is a ring-shaped vibrating gyroscope 700 shown in FIG. 12A. When N is a natural number of 2 or more or a natural number of 3 or more and M=0, 1, . . . , N−1 (hereinafter, always true in this paragraph), in a case where one of the driving electrodes 13*a* is set as a reference driving electrode, monitor electrodes 13*h*, . . . , 13*h* of the ring-shaped vibrating gyroscope 700 are not necessarily disposed $[(360/N) \times \{M+(\frac{1}{2})\}]°$ apart from the reference driving electrode 13*a* in the circumferential direction. However, an effect similar to that of the first embodiment is exerted even with the disposition of the monitor electrodes 13*h*, . . . , 13*h* shown in FIG. 12A.

Another example of the above is a ring-shaped vibrating gyroscope 720 shown in FIG. 12S. In the ring-shaped vibrating gyroscope 720, monitor electrodes 13*h*, 13*h* are disposed as if two out of the monitor electrodes 13*h*, . . . , 13*h* are removed from the ring-shaped vibrating gyroscope 700 shown in FIG. 12A. However, an effect similar to that of the first embodiment is exerted even with the disposition of the monitor electrodes 13*h*, 13*h* shown in FIG. 12S.

Figure 12C:
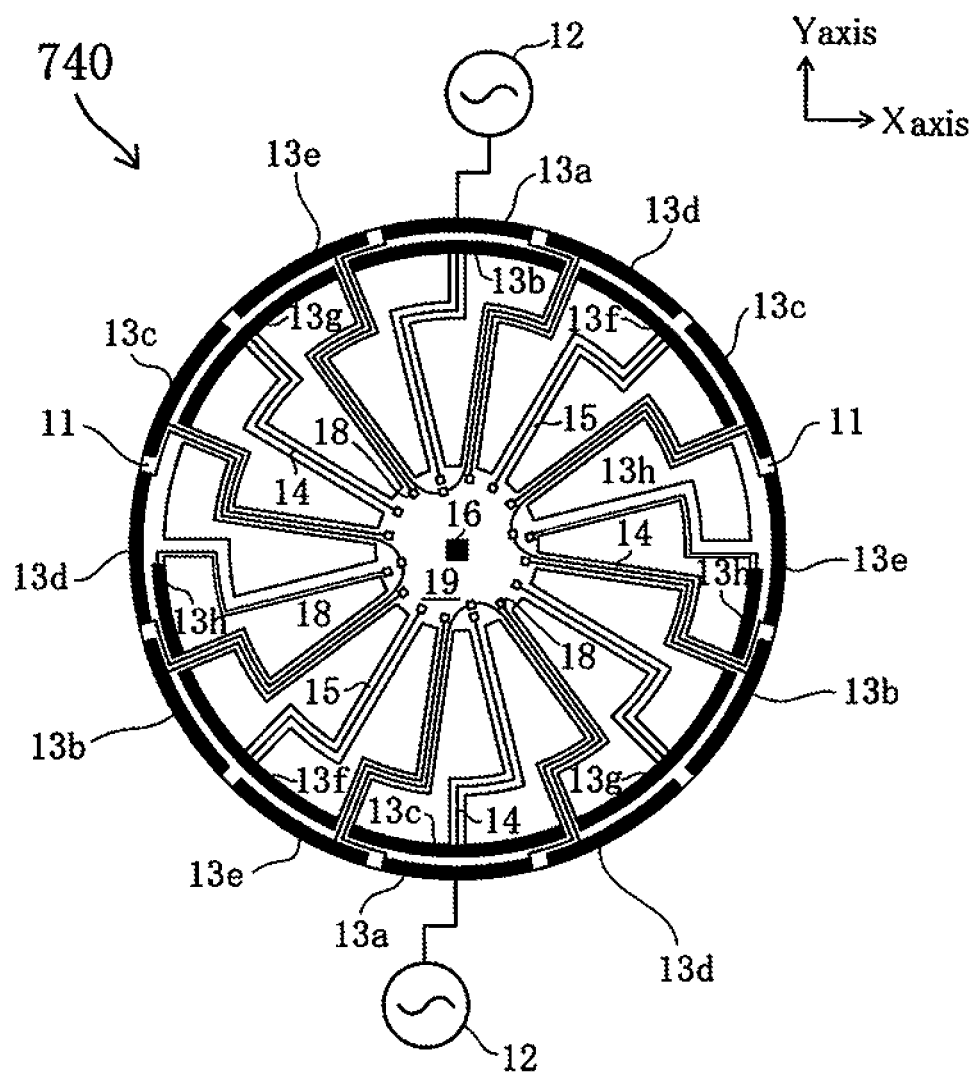
FIG. 12C is a front view of a structure having a principal function in a ring-shaped vibrating gyroscope according to a different embodiment of the present invention.

Still another example of the above is a ring-shaped vibrating gyroscope 740 shown in FIG. 12C. In the ring-shaped vibrating gyroscope 740, monitor electrodes 13*h*, 13*h* are disposed as if the remaining two out of the monitor electrodes 13*h*, . . . , 13*h* are removed from the ring-shaped vibrating gyroscope 700 shown in FIG. 12A. However, an effect similar to that of the first embodiment is exerted even with the disposition of the monitor electrodes 13*h*, 13*h* shown in FIG. 12C.

Figure 12D:
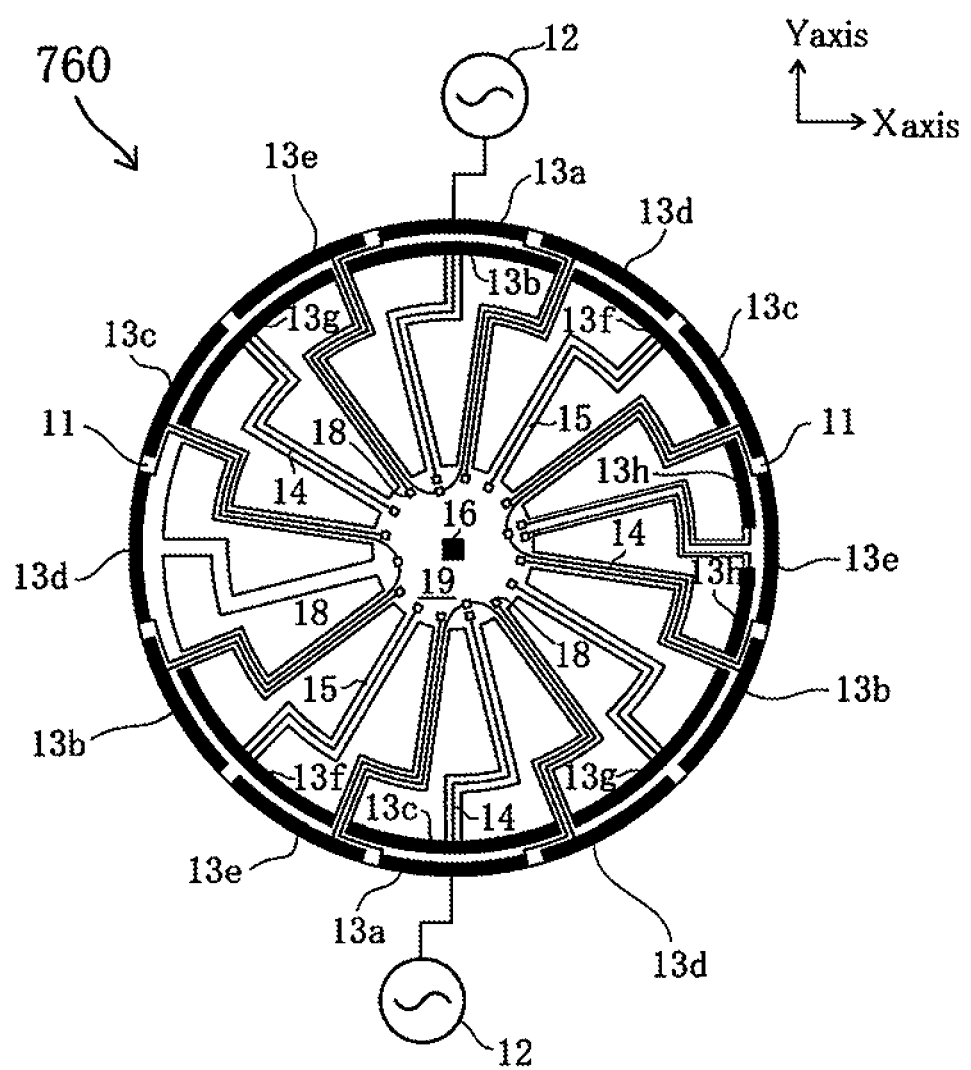
FIG. 12D is a front view of a structure having a principal function in a ring-shaped vibrating gyroscope according to a different embodiment of the present invention.

Further, a different example of the above is a ring-shaped vibrating gyroscope 760 shown in FIG. 12D. In the ring-shaped vibrating gyroscope 760, monitor electrodes 13*h*, 13*h* are disposed as if two different from the above cases out of the monitor electrodes 13*h*, . . . , 13*h* are removed from the ring-shaped vibrating gyroscope 700 shown in FIG. 12A. However, an effect similar to that of the first embodiment is exerted even with the disposition of the monitor electrodes 13*h*, 13*h* shown in FIG. 12D.

Figure 12E:
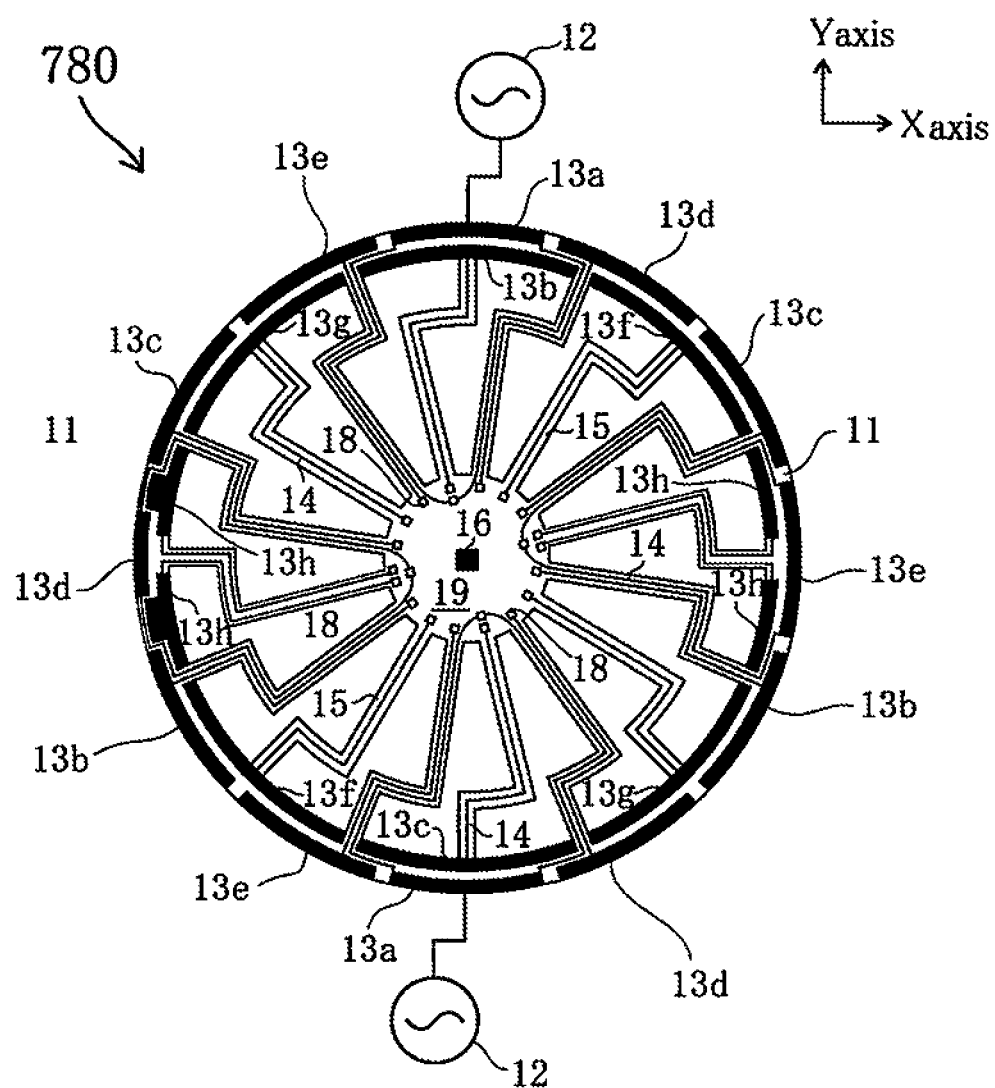
FIG. 12E is a front view of a structure having a principal function in a ring-shaped vibrating gyroscope according to a different embodiment of the present invention.

Moreover, a different example of the above is a ring-shaped vibrating gyroscope 780 shown in FIG. 12E. Some of monitor electrodes 13*h*, . . . , 13*h* of the ring-shaped vibrating gyroscope 780 are disposed in a region from the inner peripheral edge to the center line of the ring-shaped vibrating body 11. Each of second detection electrodes 13*d* has a smaller area. However, the effect of the first embodiment is at least partially exerted even with the disposition of the monitor electrodes 13*h*, . . . , 13*h* shown in FIG. 12E. In this case, in view of the symmetrical disposition of the monitor electrodes 13*h*, the ring-shaped vibrating gyroscope 100 of the first embodiment is more preferable in comparison to the ring-shaped vibrating gyroscope 780 shown in FIG. 12E. Similarly, even in a case where some or all of the monitor electrodes 13*h*, . . . , 13*h* are disposed in a region from the outer peripheral edge to the center line of the ring-shaped vibrating body 11 so as not to be symmetrical with respect to the center line, an effect similar to that of the first embodiment is exerted.

As shown in each of the examples described above, in any one of the ring-shaped vibrating gyroscopes according to the present invention, excited is the primary vibration in the in-plane vibration mode. Thus, the monitor electrodes may be disposed on the plane of the ring-shaped vibrating body 11 with a high degree of flexibility. However, for example, in a vibration mode of cos Nθ, when L=0, 1, . . . , 2N−1 (hereinafter, always true in this paragraph), the respective monitor electrodes 13*h* are disposed so as not to be $[(180/N) \times \{L+(\frac{1}{2})\}]°$ apart from the reference driving electrode in the circumferential direction or are disposed so as not to be axisymmetrical with respect to the above angular positions. The monitor electrodes are not disposed at such former positions since deformation of the ring-shaped vibrating body 11 is eliminated (zero) in the former positions. The monitor electrodes are not disposed at such latter positions since the monitor electrodes are deformed in directions opposite to each other so as to cancel the deformations each other at the latter positions. Moreover, the respective monitor electrodes 13*h* are disposed so as not to be symmetrical with respect to the center line. The monitor electrodes are not disposed at such positions since the monitor electrodes are deformed in directions opposite to each other so as to cancel the deformations each other at the positions. In a limited planar region of the ring-shaped vibrating body 11 that is particularly reduced in size, the disposition of the monitor electrodes 13*h* as in the first embodiment will facilitate the disposition of the other electrode groups and/or the metal tracks. More specifically, when N is a natural number of 2 or more or a natural number of 3 or more and M=0, 1, . . . , N−1 (hereinafter, always true in this paragraph), in a case where one of the driving electrodes 13*a* is set as a reference driving electrode, it is a preferable aspect to dispose the monitor electrodes 13*h* so as to be $[(360/N) \times \{M+(\frac{1}{2})\}]°$ apart from the reference driving electrode 13a in the circumferential direction.

Other Modifications

Applicable to the second embodiment are respective modifications similar to those of the first embodiment as described above. Therefore, there is exerted an advantageous effect in accordance with each of the configurations thereof.

Figure 13:
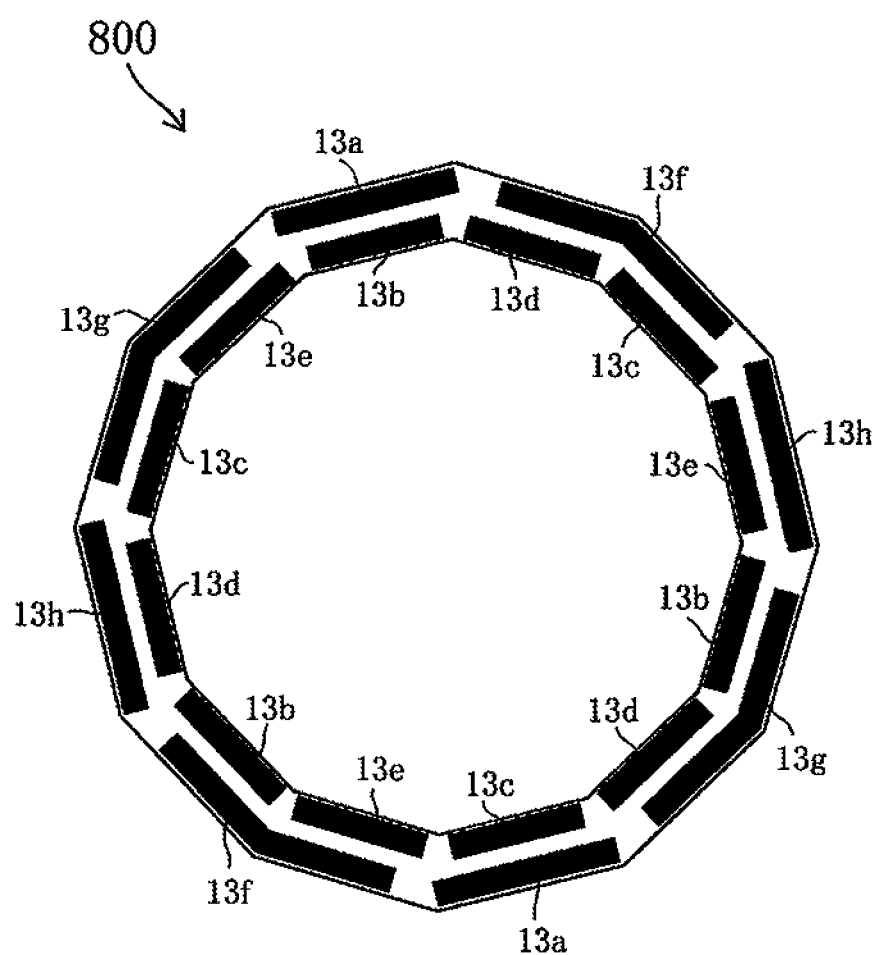
FIG. 13 is a front view of a structure having a principal function in a ring-shaped vibrating gyroscope according to a different embodiment of the present invention.

Each of the embodiments described above refers to the vibrating gyroscope using the ring-shaped vibrating body. However, the ring-shaped vibrating body may be replaced with a polygonal vibrating body. There is exerted an effect substantially similar to that of the present invention even with use of a vibrating body in a regular polygonal shape such as a regular hexagonal shape, a regular octagonal shape, a regular dodecagonal shape, a regular icosagonal shape, or the like. Further alternatively, there may be adopted a vibrating body such as a dodecagonal vibrating body 111 of a ring-shaped vibrating gyroscope 800 shown in FIG. 13. It is preferable, in view of stability of the vibrating body during the vibration motion, to adopt a vibrating body in a polygonal shape that is symmetrical with respect to a point in a front view of the vibrating body. It is noted that the "ring shape" is inclusive of an elliptical shape. Unlike FIG. 1 and the like, the leg portions and the post are not illustrated in FIG. 13 for easier comprehension of the figure.

Moreover, adopted in each of the embodiments described above is the ring-shaped vibrating gyroscope that is mainly made of silicon. However, these embodiments are not limited to such a case. Alternatively, the main material for the vibrating gyroscope may be germanium or silicon germanium, for example. In the above examples, it is possible to apply the known anisotropic dry etching technique by particularly adopting silicon or silicon germanium, which results in significant contribution to the improvement in processing accuracy of the entire gyroscope including the vibrating body. As having been described so far, modifications made within the scope of the present invention inclusive of other combinations of the respective embodiments will be also included in the scope of the patent claims.

INDUSTRIAL APPLICABILITY

The present invention is applicable, as a vibrating gyroscope, to portions of various types of devices.

The invention claimed is:

1. A vibrating gyroscope comprising:
a ring-shaped vibrating body having a uniform plane;
a leg portion flexibly supporting the ring-shaped vibrating body and having a fixed end;
a fixed potential electrode; and
a plurality of electrodes formed on the plane with a piezoelectric film sandwiched between an upper-layer metallic film and a lower-layer metallic film in a thickness direction thereof, wherein
the plurality of electrodes include:
(1) when N is a natural number of 2 or more, a group of driving electrodes for exciting an in-plane primary vibration of the ring-shaped vibrating body in a vibration mode of $\cos N\theta$, which are disposed $(360/N)°$ apart from each other in a circumferential direction; and
(2) a group of detection electrodes for detecting a secondary vibration in a vibration mode of $\cos(N+1)\theta$ generated when an angular velocity is applied to the ring-shaped vibrating body, and, when one of the driving electrodes is set as a reference driving electrode and $S=0, 1, \ldots, N$ (hereinafter true), the group of detection electrodes having an electrode disposed $[\{360/(N+1)\} \times S]°$ apart from the reference driving electrode and/or an electrode disposed $[\{360/(N+1)\} \times \{S+(\frac{1}{2})\}]°$ apart from the reference driving electrode, and
each of the driving electrodes is disposed in the plane and on a first electrode disposition portion in a region from an outer peripheral edge of the ring-shaped vibrating body to a vicinity of the outer peripheral edge and/or a region from an inner peripheral edge thereof to a vicinity of the inner peripheral edge, and each of the detection electrodes is disposed on a second electrode disposition portion that is not electrically connected to the first electrode disposition portion.

2. The vibrating gyroscope according to claim 1, wherein when the detection electrodes are referred to as first detection electrodes, the plurality of electrodes further include:

(3) a group of second detection electrodes for detecting a secondary vibration in a vibration mode of $\cos N\theta$ generated when an angular velocity is applied to the ring-shaped vibrating body, and, when $M=0, 1, \ldots, N-1$ (hereinafter true), the group of second detection electrodes having an electrode disposed $[(360/N) \times \{M+(\frac{1}{4})\}]°$ apart from the reference driving electrode and/or an electrode disposed $[(360/N) \times \{M+(\frac{3}{4})\}]°$ apart from the reference driving electrode, and
each of the second detection electrodes is disposed on the first electrode disposition portion.

3. The vibrating gyroscope according to claim 1, wherein when the detection electrodes are referred to as first detection electrodes, the plurality of electrodes further include:

(3) a group of second detection electrodes for detecting a secondary vibration of a vibration axis $\{90/(N+1)\}°$ apart from that of the secondary vibration in (2), the group of second detection electrodes having an electrode disposed $[\{360/(N+1)\} \times \{S+(\frac{1}{4})\}]°$ apart from the reference driving electrode and/or an electrode disposed $[\{360/(N+1)\} \times \{S+(\frac{3}{4})\}]°$ apart from the reference driving electrode; and (4) a group of third detection electrodes for detecting a secondary vibration in a vibration mode of $\cos N\theta$ generated when an angular velocity is applied to the ring-shaped vibrating body, and, when $M=0, 1, \ldots, N-1$ (hereinafter true), the group of third detection electrodes having an electrode disposed $[(360/N) \times \{M+(\frac{1}{4})\}]°$ apart from the reference driving electrode and/or an electrode disposed $[(360/N) \times \{M+(\frac{3}{4})\}]°$ apart from the reference driving electrode, and
each of the second detection electrodes is disposed on the second electrode disposition portion, and each of the third detection electrodes is disposed on the first electrode disposition portion.

4. The vibrating gyroscope according to claim 1, wherein the plurality of electrodes further include:

(3) when $L=0, 1, \ldots, 2N-1$ (hereinafter true), a group of monitor electrodes disposed so as not to be $(180/N) \times \{L+(\frac{1}{2})\}°$ apart from the reference driving electrode in the circumferential direction.

5. The vibrating gyroscope according to claim 2, wherein the plurality of electrodes further include:

(4) when $L=0, 1, \ldots, 2N-1$ (hereinafter true), a group of monitor electrodes disposed so as not to be $(180/N) \times \{L+(\frac{1}{2})\}°$ apart from the reference driving electrode in the circumferential direction.

6. The vibrating gyroscope according to claim 1, wherein the plurality of electrodes further include:
(3) when M=0, 1, . . . , N−1 (hereinafter true), a group of monitor electrodes disposed $[(360/N)\times\{M+(½)\}]°$ apart from the reference driving electrode in the circumferential direction.

7. The vibrating gyroscope according to claim 2, wherein the plurality of electrodes further include:
(4) when M=0, 1, . . . , N−1 (hereinafter true), a group of monitor electrodes disposed $[(360/N)\times\{M+(½)\}]°$ apart from the reference driving electrode in the circumferential direction.

8. The vibrating gyroscope according to claim 1, wherein the second electrode disposition portion includes a center line connecting centers in a width direction from the outer peripheral edge to the inner peripheral edge.

9. The vibrating gyroscope according to of claim 2, wherein
the second electrode disposition portion includes a center line connecting centers in a width direction from the outer peripheral edge to the inner peripheral edge.

10. The vibrating gyroscope according to claim 1, wherein the ring-shaped vibrating body is formed with a silicon substrate, and
only the upper-layer metallic film, the piezoelectric film, and the lower-layer metallic film are substantially visible in a front view.

11. The vibrating gyroscope according to claim 1, wherein the ring-shaped vibrating body is formed with a silicon substrate, and
only the upper-layer metallic film and the lower-layer metallic film are substantially visible in a front view.

* * * * *